United States Patent
Lin et al.

(10) Patent No.: US 9,678,826 B2
(45) Date of Patent: Jun. 13, 2017

(54) FAULT ISOLATION METHOD, COMPUTER SYSTEM, AND APPARATUS

(71) Applicant: Huawei Technologies Co., Ltd., Shenzhen (CN)

(72) Inventors: Muhui Lin, Hangzhou (CN); Junjie Wang, Hangzhou (CN); Ruiling Wang, Hangzhou (CN)

(73) Assignee: Huawei Technologies Co., Ltd., Shenzhen (CN)

(*) Notice: Subject to any disclaimer, the term of this patent is extended or adjusted under 35 U.S.C. 154(b) by 399 days.

(21) Appl. No.: 14/549,395

(22) Filed: Nov. 20, 2014

(65) Prior Publication Data

US 2015/0082080 A1    Mar. 19, 2015

Related U.S. Application Data

(63) Continuation of application No. PCT/CN2013/083325, filed on Sep. 11, 2013.

(51) Int. Cl.
*G06F 11/00* (2006.01)
*G06F 11/07* (2006.01)
(Continued)

(52) U.S. Cl.
CPC ...... *G06F 11/0793* (2013.01); *G06F 11/0745* (2013.01); *G06F 11/0751* (2013.01);
(Continued)

(58) Field of Classification Search
CPC ............ G06F 11/0745; G06F 11/0751; G06F 11/0776; G06F 11/0793; G06F 11/0796;
(Continued)

(56) References Cited

U.S. PATENT DOCUMENTS 6,557,121 B1    4/2003    Mclaughlin et al.
7,992,058 B2    8/2011    Maroni et al.
(Continued)

FOREIGN PATENT DOCUMENTS

CN    1197954 A    11/1998
CN    1547706 A    11/2004
(Continued)

OTHER PUBLICATIONS

Foreign Communication From a Counterpart Application, PCT Application No. PCT/CN2013/083325, International Search Report dated Jul. 9, 2014, 7 pages.
(Continued)

*Primary Examiner* — Marc Duncan
(74) *Attorney, Agent, or Firm* — Conley Rose, P.C.

(57) ABSTRACT

A fault isolation method, computer system, and apparatus, which are capable of monitoring a state of a second endpoint device in the extended domain, and setting a device state record according to the state of the second endpoint device; after an access request between the second endpoint device and the primary domain is received, querying the device state record according to identifier information that is of the second endpoint device and in the access request, and determining the state of the second endpoint device; and if the state of the second endpoint device is a fault state, discarding the access request to prevent communication between the faulty second endpoint device and the primary domain and prevent spreading a fault to the primary domain, thereby ensuring system reliability.

19 Claims, 9 Drawing Sheets

(51) Int. Cl.
  *G06F 11/30* (2006.01)
  *G06F 11/34* (2006.01)
  *G06F 13/28* (2006.01)
(52) U.S. Cl.
  CPC ...... *G06F 11/0772* (2013.01); *G06F 11/0796* (2013.01); *G06F 11/3027* (2013.01); *G06F 11/3041* (2013.01); *G06F 11/3051* (2013.01); *G06F 11/349* (2013.01); *G06F 11/3485* (2013.01); *G06F 13/28* (2013.01)
(58) Field of Classification Search
  CPC ............. G06F 11/3027; G06F 11/3041; G06F 11/3051; G06F 11/3485; G06F 11/349; G06F 13/28
  See application file for complete search history.

(56) References Cited

U.S. PATENT DOCUMENTS

| | | | |
|---|---|---|---|
| 8,806,098 B1* | 8/2014 | Mandapuram | G06F 13/4022 710/104 |
| 2003/0131179 A1 | 7/2003 | Ajanovic et al. | |
| 2004/0230861 A1* | 11/2004 | Bailey | G06F 11/0712 714/6.12 |
| 2006/0159115 A1 | 7/2006 | Haneda et al. | |
| 2007/0208899 A1 | 9/2007 | Freking et al. | |
| 2009/0063894 A1* | 3/2009 | Billau | G06F 11/2005 714/5.11 |
| 2009/0164694 A1* | 6/2009 | Talayco | G06F 13/4022 710/316 |
| 2010/0074388 A1 | 3/2010 | Coppin | |
| 2011/0131362 A1* | 6/2011 | Klinglesmith | H04L 12/6418 710/313 |
| 2011/0320860 A1* | 12/2011 | Coneski | G06F 11/0793 714/5.1 |
| 2011/0320887 A1* | 12/2011 | Craddock | G06F 11/0745 714/49 |
| 2012/0284448 A1* | 11/2012 | Ayzenfeld | G06F 13/105 710/313 |
| 2013/0212481 A1 | 8/2013 | Zhu et al. | |
| 2014/0372741 A1* | 12/2014 | Gardiner | G06F 13/4045 713/2 |
| 2015/0006780 A1* | 1/2015 | Shao | G06F 13/4022 710/316 |
| 2015/0096051 A1* | 4/2015 | Natu | H04L 63/101 726/27 |

FOREIGN PATENT DOCUMENTS

| | | |
|---|---|---|
| CN | 102662788 A | 9/2012 |
| CN | 102906707 A | 1/2013 |

OTHER PUBLICATIONS

Foreign Communication From a Counterpart Application, PCT Application No. PCT/CN2013/083325, Written Opinion dated Jul. 9, 2014, 6 pages.
Foreign Communication From a Counterpart Application, European Application No. 13882632.6, Extended European Search Report dated Oct. 19, 2015, 7 pages.
Foreign Communication From a Counterpart Application, Chinese Application No. 201380001454.4, Chinese Search Report dated Oct. 23, 2015, 9 pages.

* cited by examiner

FAULT ISOLATION METHOD, COMPUTER SYSTEM, AND APPARATUS

CROSS-REFERENCE TO RELATED APPLICATIONS

This application is a continuation of International Patent Application No. PCT/CN2013/083325, filed on Sep. 11, 2013, which is hereby incorporated by reference in its entirety.

TECHNICAL FIELD

The present invention relate to computer technologies, and in particular, to a fault isolation method, computer system, and apparatus.

BACKGROUND

A Peripheral Component Interconnect Express (PCIe) bus technology is a high-performance bus technology used to interconnect a central processing unit (CPU) with a peripheral device. The PCIe, as a new generation bus and interface standard, performs data transmission in a serial interconnection manner and in a point-to-point form, which greatly increases a transmission rate and also creates a condition for further increasing a frequency. The PCIe is extensively applied to industrial servers, personal computers (PCs), embedded computing/communication, workstations, and the like, and gradually replaces buses such as a Peripheral Component Interconnect (PCI) and an Accelerated Graphics Port (AGP). Currently, faults of a PCIe device account for a major part of all faults of a system. Monitoring the system in real time, identifying occurrence of an error, and detecting and processing system faults can effectively prevent a complete interruption to system operation, and is a Reliability, Availability, and Serviceability (RAS) feature ensuring continuous availability of the system.

In the prior art, when a PCIe device is faulty, an error packet may be generated, and the error packet is routed from the faulty device to a root complex; after acquiring the error packet, the root complex generates a system interruption and reports the error packet to an operating system; the operating system performs error handling according to the error packet. In the prior art, there is a time window from the time when the faulty device generates the error packet to the time when the operating system processes the error packet; within the time window, a CPU or another PCIe endpoint device and the faulty device may continue to access each other, so that the faulty device cannot be isolated effectively, which may cause spreading of the fault and affect system reliability.

SUMMARY

The present invention provides a fault isolation method, computer system, and apparatus, which can isolate a faulty device, prevent spreading of a fault, and improve system reliability.

According to a first aspect, an embodiment of the present invention provides a fault isolation method, used in a PCIe interconnected computer system, where the computer system includes a primary domain and an extended domain, the primary domain includes a root complex, a first endpoint device, and a root complex endpoint device, and the extended domain includes the root complex endpoint device and a second endpoint device; and the method includes monitoring a state of the second endpoint device in the extended domain; setting a device state record according to the state of the second endpoint device, where the device state record includes a correspondence between identifier information of the second endpoint device and the state of the second endpoint device; receiving an access request, where the access request includes an access request from the second endpoint device to the primary domain or an access request from the primary domain to the second endpoint device; querying the device state record according to the identifier information that is of the second endpoint device and in the access request, and determining the state of the second endpoint device; and if the state of the second endpoint device is a fault state, discarding the access request to prevent communication between the second endpoint device and the primary domain.

With reference to the first aspect, in a first possible implementation manner, the monitoring a state of the second endpoint device in the extended domain includes receiving an error message sent by the second endpoint device, or receiving a device detection response message used to indicate whether the second endpoint device exists; and determining the state of the second endpoint device according to the error message or the device detection response message.

With reference to the first possible implementation manner of the first aspect, in a second possible implementation manner, the identifier information of the second endpoint device includes first memory addresses of the second endpoint device, and the first memory addresses are memory addresses, in the primary domain, of the second endpoint device; and the setting a device state record according to the state of the second endpoint device, where the device state record includes a correspondence between identifier information of the second endpoint device and the state of the second endpoint device, includes acquiring a bus/device/function (BDF) identifier or second memory addresses that are of the second endpoint device and carried in the error message or the device detection response message, where the second memory addresses are memory addresses, in the extended domain, of the second endpoint device; acquiring the first memory addresses of the second endpoint device according to the BDF identifier or the second memory addresses; and recording, in the device state record, a correspondence between the first memory addresses of the second endpoint device and the state of the second endpoint device.

With reference to the second possible implementation manner of the first aspect, in a third possible implementation manner, the acquiring the first memory addresses of the second endpoint device according to the BDF identifier or the second memory addresses includes converting the second memory addresses into the first memory addresses of the second endpoint device according to a stored mapping relationship between the second memory addresses of the second endpoint device and the first memory addresses of the second endpoint device; or acquiring the second memory addresses of the second endpoint device according to a stored mapping relationship between the BDF identifier of the second endpoint device and the second memory addresses of the second endpoint device, and converting the second memory addresses into the first memory addresses of the second endpoint device according to a stored mapping relationship between the second memory addresses of the second endpoint device and the first memory addresses of the second endpoint device.

With reference to the second possible implementation manner or the third possible implementation manner of the first aspect, in a fourth possible implementation manner, the first memory addresses of the second endpoint device include a first memory address of configuration space access, a first memory address of message signaled interrupts access, a first memory address of memory mapped input/output access, and a first memory address of direct memory access; and the recording, in the device state record, a correspondence between the first memory addresses of the second endpoint device and the state of the second endpoint device includes recording, in the device state record, a correspondence between each first memory address of the second endpoint device and the state of the second endpoint device.

According to a second aspect, an embodiment of the present invention provides a fault isolation apparatus, used in a PCIe interconnected computer system, where the computer system includes a primary domain and an extended domain, the primary domain includes a root complex, a first endpoint device, and a root complex endpoint device, and the extended domain includes the root complex endpoint device and a second endpoint device; and the apparatus includes a monitoring unit configured to monitor a state of the second endpoint device in the extended domain; a recording unit configured to set a device state record according to the state of the second endpoint device, where the device state record includes a correspondence between identifier information of the second endpoint device and the state of the second endpoint device; a receiving unit configured to receive an access request, where the access request includes an access request from the second endpoint device to the primary domain or an access request from the primary domain to the second endpoint device; a determining unit configured to query the device state record according to the identifier information that is of the second endpoint device and in the access request, and determine the state of the second endpoint device; and a processing unit configured to, when the state of the second endpoint device is a fault state, discard the access request to prevent communication between the second endpoint device and the primary domain.

With reference to the second aspect, in a first possible implementation manner, the monitoring unit is configured to receive an error message sent by the second endpoint device, or receive a device detection response message used to indicate whether the second endpoint device exists; and determine the state of the second endpoint device according to the error message or the device detection response message.

With reference to the first possible implementation manner of the second aspect, in a second possible implementation manner, the identifier information of the second endpoint device includes first memory addresses of the second endpoint device, and the first memory addresses are memory addresses, in the primary domain, of the second endpoint device; and the recording unit includes: an address converting module subunit configured to, when the monitoring unit determines the fault state of the second endpoint device, acquire a BDF identifier or second memory addresses that are of the second endpoint device and carried in the error message or the device detection response message, and acquire the first memory addresses of the second endpoint device according to the BDF identifier or the second memory addresses, where the second memory addresses are memory addresses, in the extended domain, of the second endpoint device; and a state recording subunit configured to record, in the device state record, a correspondence between the first memory addresses of the second endpoint device and the state of the second endpoint device.

With reference to the second possible implementation manner of the second aspect, in a third possible implementation manner, the address converting module subunit is further configured to store a mapping relationship between the second memory addresses of the second endpoint device and the first memory addresses of the second endpoint device, and store a mapping relationship between the BDF identifier of the second endpoint device and the second memory addresses of the second endpoint device; and the address converting module subunit is configured to convert the second memory addresses into the first memory addresses of the second endpoint device according to the stored mapping relationship between the second memory addresses of the second endpoint device and the first memory addresses of the second endpoint device; or acquire the second memory addresses of the second endpoint device according to the stored mapping relationship between the BDF identifier of the second endpoint device and the second memory addresses of the second endpoint device, and convert the second memory addresses into the first memory addresses of the second endpoint device according to the stored mapping relationship between the second memory addresses of the second endpoint device and the first memory addresses of the second endpoint device.

With reference to the second possible implementation manner or the third possible implementation manner of the second aspect, in a fourth possible implementation manner, the first memory addresses of the second endpoint device include a first memory address of configuration space access, a first memory address of message signaled interrupts access, a first memory address of memory mapped input/output access, and a first memory address of Direct Memory Access (DMA); and the address converting module subunit is configured to record a correspondence between each first memory address of the second endpoint device and the second endpoint device.

In the present invention, a state of a second endpoint device in an extended domain can be monitored, and a device state record is set according to the state of the second endpoint device; after an access request between the second endpoint device and a primary domain is received, the device state record is queried according to identifier information that is of the second endpoint device and in the access request, and the state of the second endpoint device is determined; if the state of the second endpoint device is a fault state, the access request is discarded to prevent communication between the faulty second endpoint device and the primary domain and prevent spreading a fault to the primary domain, thereby ensuring system reliability.

BRIEF DESCRIPTION OF DRAWINGS

To describe the technical solutions in the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

Embodiments of the present invention provide a fault isolation method, computer system, and apparatus, which are applied to a computer system including a PCIe primary domain and a PCIe extended domain. A root complex endpoint device in the extended domain is an endpoint device in the primary domain. When any endpoint device in the extended domain is faulty, in the embodiments of the present invention, mutual access between the primary domain and the endpoint device in the extended domain can be prevented, which prevents spreading of a fault and ensures system availability.

Figure 1:
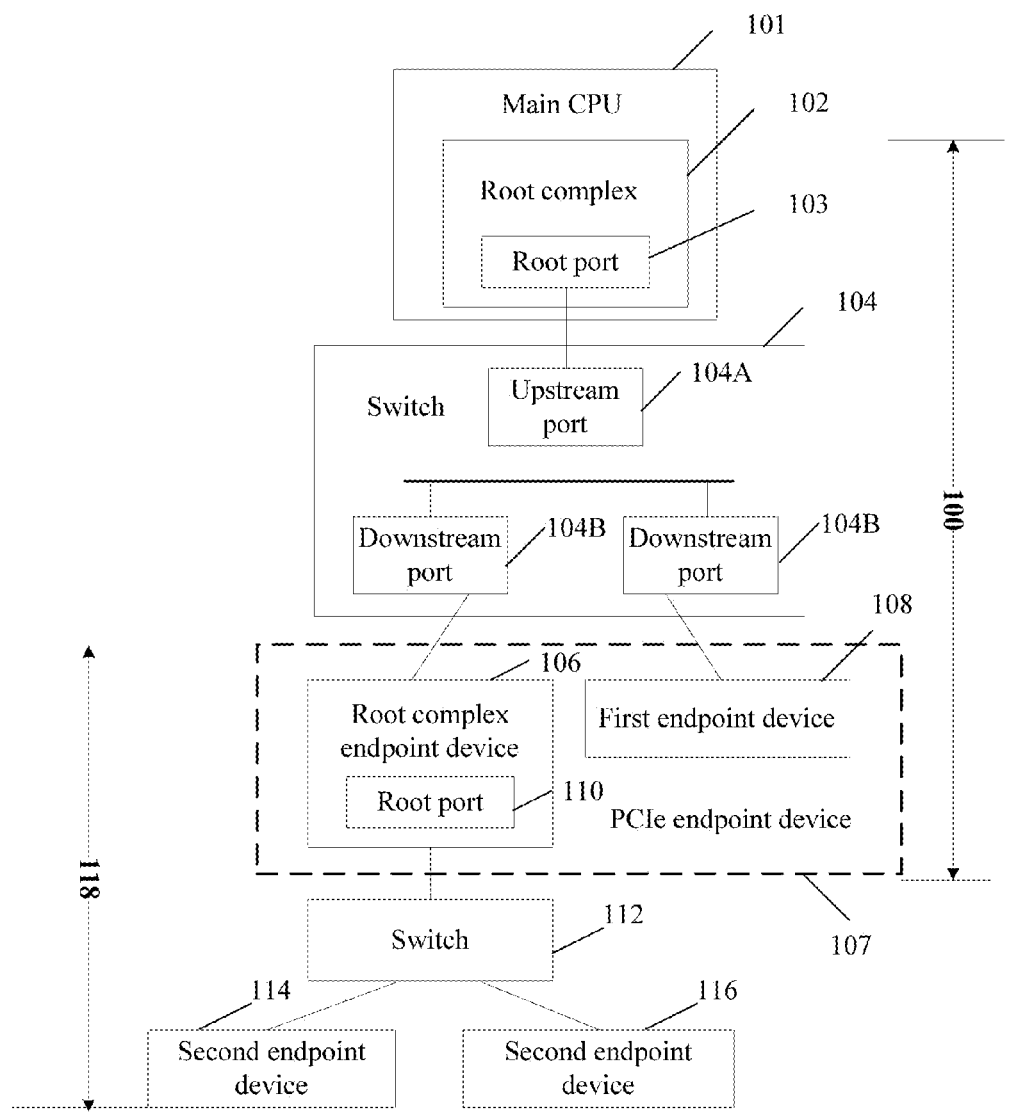
FIG. 1 is a system block diagram of a computer system including a PCIe primary domain and a PCIe extended domain according to an embodiment of the present invention.

FIG. 1 is a system block diagram of a computer system including a PCIe primary domain and a PCIe extended domain. The computer system includes a primary domain 100 and an extended domain 118, and the computer system extends a PCIe domain using a root complex endpoint (RCEP) device 106; the primary domain 100 includes a root complex (RC) 102, a switch 104, and at least one PCIe endpoint device 107; the root complex 102 is connected to an upstream port 104A of the switch 104 using a root port 103; a downstream port 104B of the switch 104 is connected to the PCIe endpoint device 107, so that the root complex 102 is connected to the PCIe endpoint device 107 using the switch 104; the root complex 102 may be integrated into a main CPU 101. The foregoing figure takes an example in which the primary domain 100 includes one switch. In another embodiment, the primary domain 100 may include a plurality of switches, and each switch may be connected to one or more PCIe endpoint devices.

The root complex 102 is configured to process and forward a request between the main CPU 101 and the PCIe endpoint device 107; the switch 104 is configured to route a request downstream to the PCIe endpoint device connected to the downstream port 104B, and route a request upstream from each independent downstream port to a single root complex, and may be further configured to route a request from one downstream port to another downstream port. The PCIe endpoint device 107 has a function of initiating a request and completing PCIe transaction processing, and the PCIe endpoint device 107 may be a storage device, a network adapter, an audio card, or the like.

The PCIe endpoint device 107 in the primary domain 100 includes the RCEP 106. The RCEP 106 can not only initiate a request and complete PCIe transaction processing, but also, because the RCEP 106 is provided with a hardware module, which has a same function as a root complex and a device driver, implement connection between the extended domain 118 and the primary domain 100, and manage and forward a request between the extended domain 118 and the primary domain 100. As shown in FIG. 1, the extended domain 118 includes the RCEP 106 which serves as the root complex in the extended domain, a switch 112, and second endpoint devices 114 and 116 (there may be multiple second endpoint devices, and may also be one, and this embodiment of the present invention uses two endpoint devices as an example). The second endpoint devices 114 and 116 are separately connected to the RCEP 116 using the switch 112, and the second endpoint devices 114 and 116 may be storage devices, network adapters, audio cards, and the like. The extended domain 118 may further include multiple root ports and multiple switches, and each switch may be connected to multiple endpoint devices.

FIG. 2 is a diagram of memory address allocation of endpoint devices in the primary domain and the extended domain in the computer system shown in FIG. 1. A 64-bit physical address 202 (the address may be a memory mapped input/output, (MMIO) address) of the main CPU 101 may be divided into a memory address 203 of the primary domain and a memory address 204 of the extended domain.

Figure 2A:
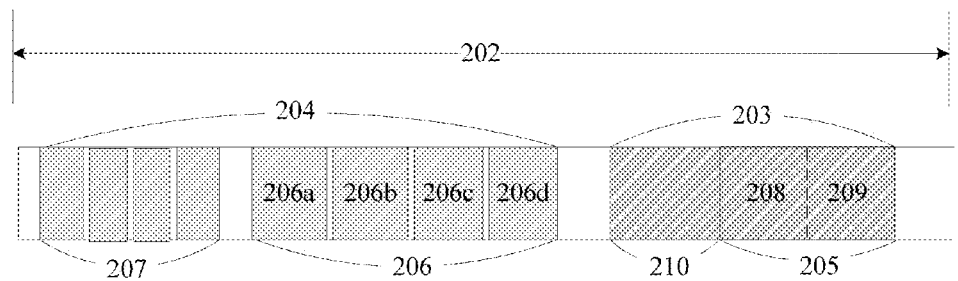
FIG. 2A is a diagram of memory address allocation of endpoint devices in the primary domain and the extended domain in the computer system shown in FIG. 1.
Figure 2B:
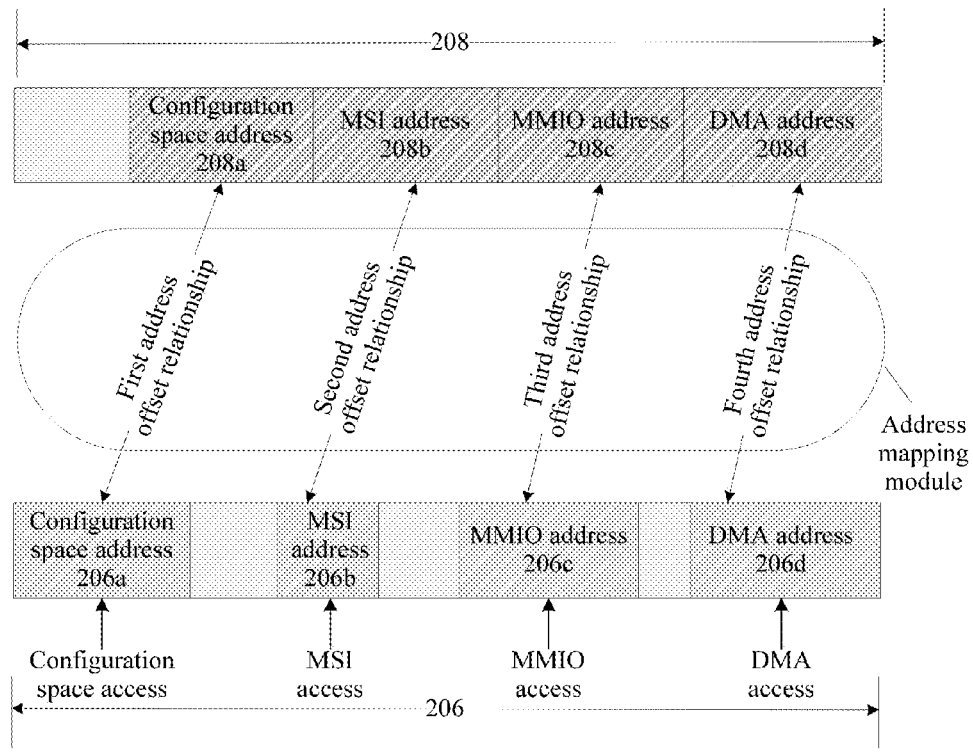
FIG. 2B is a mapping relationship between memory addresses in the primary domain in the computer system shown in FIG. 1 and memory addresses in the extended domain in the computer system shown in FIG. 1.

In the computer system shown in FIG. 1, when the system loads drivers of endpoint devices in the primary domain, the system allocates a memory address to each endpoint device in the primary domain, for example, the system allocates memory addresses to the RCEP 106 and a first endpoint device 108. As shown in FIG. 2A, one part of the MMIO address 202, that is, a memory address 205 of the RCEP 106, is allocated to the RCEP 106, and another part of the MMIO address 202, that is, a memory address 210 of the first endpoint device 108, is allocated to the first endpoint device 108. Because the RCEP 106 and the first endpoint device 108 are both endpoint devices in the primary domain, the memory address 205 and the memory address 210 jointly form the memory address 203 of the primary domain.

When the system loads the driver of the RCEP 106, the system detects drivers of both the second endpoint devices 114 and 116 in the extended domain, triggers scanning on all the second endpoint devices in the whole extended domain, and allocates a memory address to each second endpoint device in the extended domain. One part of the MMIO address 202 is allocated to the second endpoint devices in the extended domain, that is, second memory addresses (the second memory addresses are memory addresses, in the extended domain, of the second endpoint devices, and are used to represent, in the extended domain, the second endpoint devices), for example, second memory addresses 206 and 207 of the second endpoint devices 114 and 116 shown in FIG. 2A, are allocated to the second endpoint devices. A quantity of second endpoint devices is the same as a quantity of second memory addresses of the second endpoint devices. This embodiment uses two second endpoint devices as an example, and therefore the second memory addresses 206 and 207 of the second endpoint devices are allocated. In addition, besides the second memory addresses that are allocated to the second endpoint devices, first memory addresses (the first memory addresses are memory addresses, in the primary domain, of the second endpoint devices, and are used to represent, in the primary domain, the second endpoint devices) also need to be allocated to the second endpoint devices. The first memory addresses of the second endpoint devices are mainly all or one part of the memory address of the RCEP, and the memory address 205 of the RCEP is split according to the quantity of second endpoint devices in the extended domain. If the quantity of second endpoint devices is n, the memory address 205 of the RCEP is split into n parts, and each part of the memory address corresponds to one second endpoint device. The memory address 205 of the RCEP shown in FIG. 2A is split into two parts, 208 and 209, where 208 corresponds to the memory address 206 of the second endpoint device 114 and is the first memory address of the second endpoint device 114; 209 corresponds to the memory address 207 of the second endpoint device 116 and is the first memory address of the second endpoint device 116.

When the second endpoint devices 114 and 116 in the extended domain perform message exchange with the primary domain, four access manners may be used, which are configuration space access, message signaled interrupts (MSI) access, memory mapped input/output MMIO access, and DMA, so that each of the second memory address 206 and the first memory address 208 that the system allocates to the second endpoint device may be actually four types of memory addresses. In a mapping relationship between first memory addresses in the primary domain and second memory addresses in the extended domain shown in FIG. 2B, the second memory address 206 of the second endpoint device 114 may be divided into 206a, 206b, 206c, and 206d, which are used to perform configuration space access, MSI access, MMIO access, and DMA access on the second endpoint device 114 respectively. When the system allocates the four types of memory addresses to the second endpoint device 114, accordingly, the system splits the first memory address 208 that is in the memory address of the RCEP and corresponds to the second endpoint device 114 into four parts, which are a configuration space address 208a, an MSI address 208b, an MMIO address 208c, and a DMA address 208d. There is a mapping relationship between the first memory addresses 208a, 208b, 208c, and 208d of the second endpoint device 114 and the second memory addresses 206a, 206b, 206c, and 206d of the second endpoint device 114. The mapping relationship may be reflected using an address offset relationship, for example, there is a first address offset relationship between 208a and 206a, there is a second address offset relationship between 208b and 206b, there is a third address offset relationship between 208c and 206c, and there is a fourth address offset relationship between 208d and 206d. The mapping relationship between the first memory addresses of the second endpoint device and the second memory addresses of the second endpoint device may be stored in the RCEP 106, for example, stored in an address converting module of the RCEP 106, where the address converting module stores the address offset relationships, and the address converting module may perform address conversion according to the stored mapping relationship between the second memory addresses and the first memory addresses.

In a process in which the system scans the second endpoint devices in the whole extended domain, in addition to allocating a second memory address to each second endpoint device in the extended domain, the system allocates a BDF identifier to each second endpoint device in the extended domain. There is a mapping relationship between the BDF identifier of the second endpoint device and the second memory address of the second endpoint device, and the RCEP may store the mapping relationship. For example, the address converting module of the RCEP 106 stores a mapping relationship between the BDF identifier of the second endpoint device 114 and the second memory address of the second endpoint device 114, so that the RCEP 106 performs mutual conversion between the BDF identifier of the second endpoint device 114 and the second memory address of the second endpoint device 114 according to the stored mapping relationship between the BDF identifier of the second endpoint device 114 and the second memory address of the second endpoint device 114.

If the second endpoint device 114 is faulty, because there is a time window from the time when the second endpoint device 114 generates an interruption message to the time when an operating system processes the interruption message, within the time window, the faulty second endpoint device 114 in the extended domain and another endpoint device may still access each other, for example, the second endpoint device 114 communicates with an endpoint device in the primary domain or communicates, using a CPU in the primary domain, with another device, or the CPU or another endpoint device in the primary domain may also access the second endpoint device 114. However, access or communication involving the faulty second endpoint device 114 may cause another device to be faulty, for example, cause the first endpoint device 108 to be faulty or cause the CPU to perform unnecessary and repeated processing on an error message, thereby affecting system performance and severely affecting system reliability.

Fault Isolation Method

Embodiment 1 of the present invention provides a fault isolation method, which is used to prevent mutual access between a primary domain and an endpoint device in an extended domain when the endpoint device in the extended domain is faulty, thereby preventing spreading a fault to the primary domain.

Figure 3:
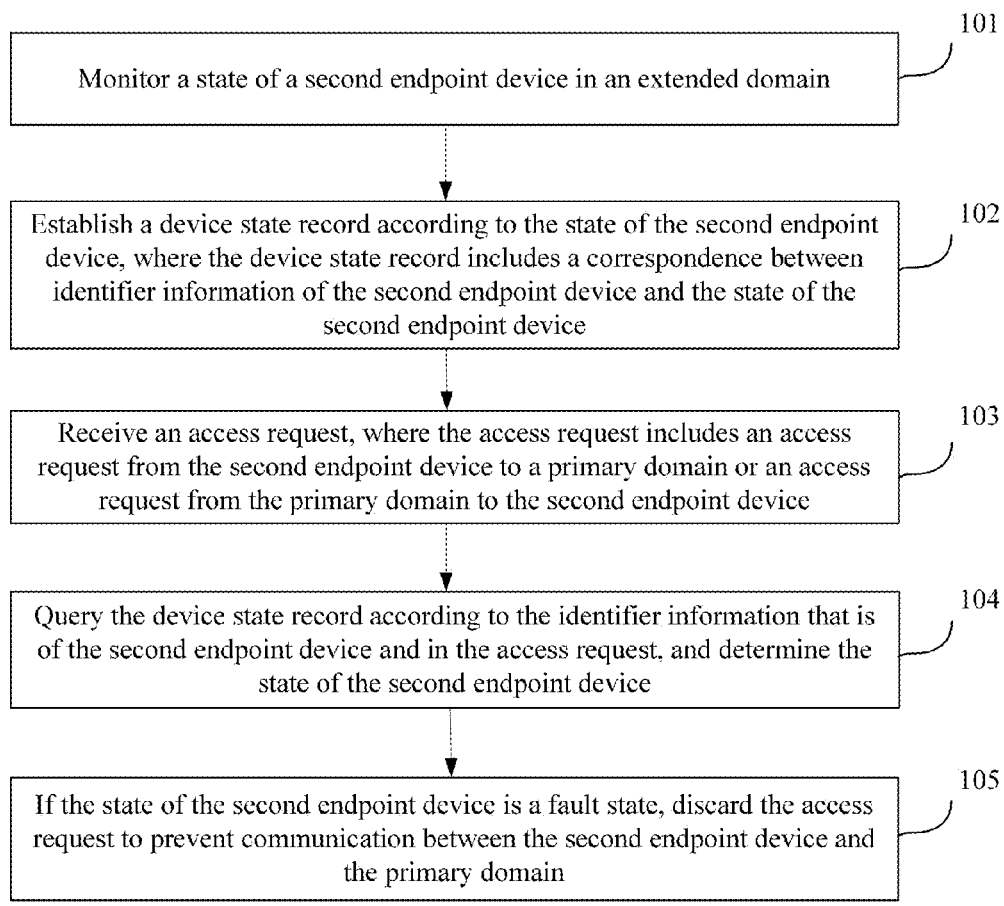
FIG. 3 is a flowchart of a fault isolation method according to Embodiment 1 of the present invention.

FIG. 3 is a flowchart of the fault isolation method according to this embodiment of the present invention, used in a PCIe interconnected computer system, where the computer system includes a primary domain and an extended domain, the primary domain includes a root complex, a first endpoint device, and an RCEP, and the extended domain includes the RCEP and a second endpoint device. The method includes the following steps.

101. Monitor a state of the second endpoint device in the extended domain.

The state of the second endpoint device may include a fault state and a non-fault state, where the fault state indicates that the second endpoint device is faulty and cannot work normally, and the non-fault state indicates that the second endpoint device in the extended domain can work normally. That the RCEP monitors the state of the second endpoint device in the extended domain may be receiving an error message sent by the second endpoint device, or receiving a device detection response message used to indicate whether the second endpoint device exists, and determining the state of the second endpoint device according to the error message or the device detection response message.

102. Set a device state record according to the state of the second endpoint device, where the device state record includes a correspondence between identifier information of the second endpoint device and the state of the second endpoint device.

The RCEP may set the device state record according to the state of the second endpoint device, where the device state record includes the correspondence between the identifier information of the second endpoint device and the state of the second endpoint device, so that the RCEP may determine the state of the second endpoint device according to the identifier information of the second endpoint device.

103. Receive an access request, where the access request includes an access request from the second endpoint device to the primary domain or an access request from the primary domain to the second endpoint device.

When the second endpoint device in the extended domain accesses the primary domain using the access request, or the primary domain accesses the second endpoint device using the access request, the access request is routed to the RCEP, and the RCEP receives the access request.

104. Query the device state record according to the identifier information that is of the second endpoint device and in the access request, and determine the state of the second endpoint device.

The access request carries the identifier information of the second endpoint device, and the RCEP may query, in the device state record, the correspondence between the identifier information of the second endpoint device and the state of the second endpoint device, and determine the state of the second endpoint device.

105. If the state of the second endpoint device is a fault state, discard the access request to prevent communication between the second endpoint device and the primary domain.

When it is determined that the state of the second endpoint device is the fault state, the access request is discarded to prevent the RCEP from forwarding the access request, thereby preventing communication between the second endpoint device and the primary domain.

In this embodiment of the present invention, the state of the second endpoint device in the extended domain is monitored, and the device state record is set according to the state of the second endpoint device, where the device state record includes the correspondence between the identifier information of the second endpoint device and the state of the second endpoint device; after the access request between the second endpoint device and the primary domain is received, the device state record is queried according to the identifier information that is of the second endpoint device and in the access request, and the state of the second endpoint device is determined; if the state of the second endpoint device is the fault state, the access request is discarded to prevent the communication between the faulty second endpoint device and the primary domain and prevent spreading a fault to the primary domain, thereby ensuring system reliability.

Embodiment 2 of the Present Invention

Figure 4:
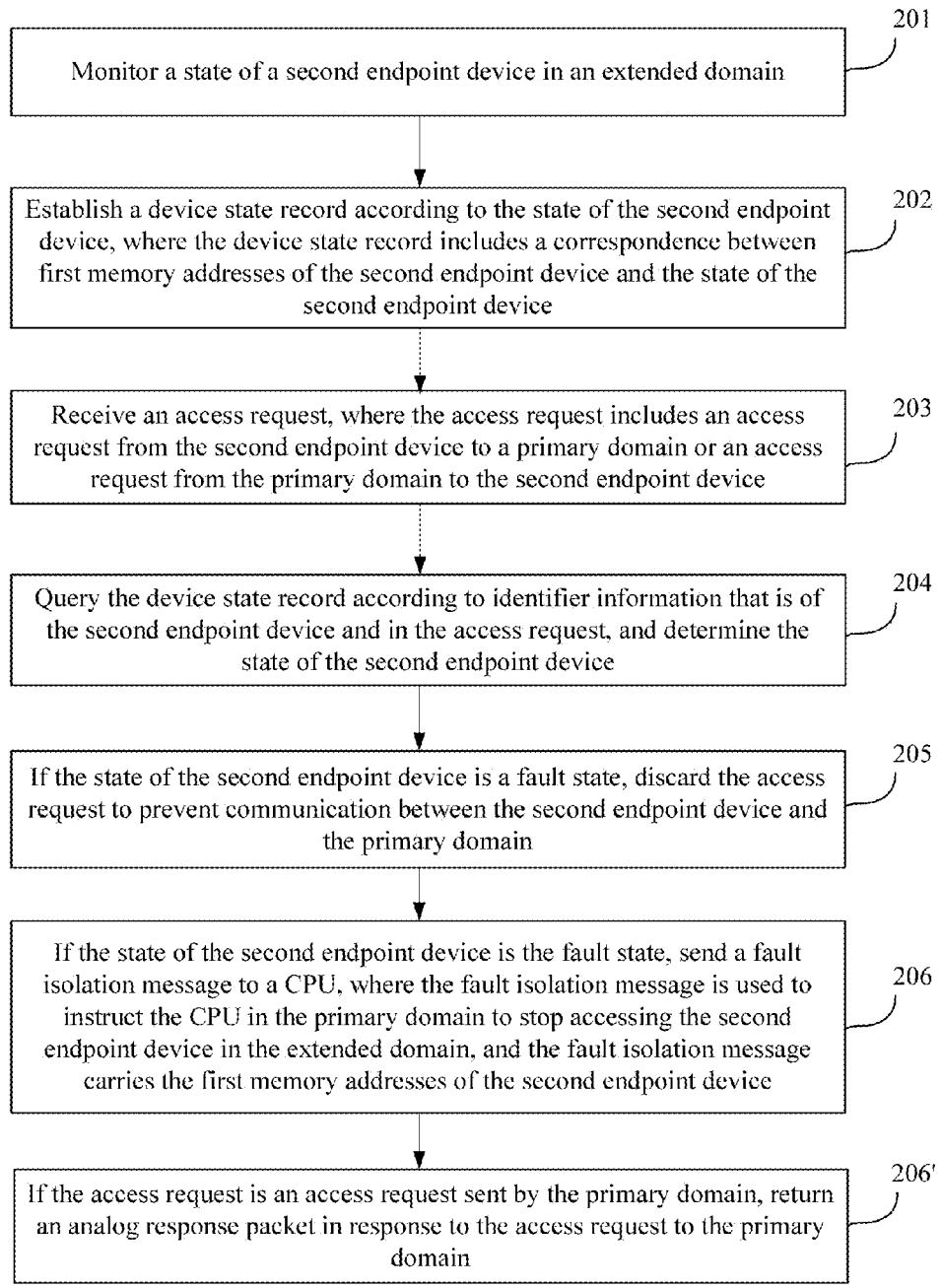
FIG. 4 is a flowchart of a fault isolation method according to Embodiment 2 of the present invention.

FIG. 4 is a flowchart of a fault isolation method according to this embodiment of the present invention, used in a PCIe interconnected computer system, where the computer system includes a primary domain and an extended domain, the primary domain includes a root complex, a first endpoint device, and an RCEP, and the extended domain includes the RCEP and a second endpoint device; and the second endpoint device performs communication interaction with the root complex or the first endpoint device in the primary domain using the RCEP. The method may include the following steps.

201. Monitor a state of the second endpoint device in the extended domain.

The state of the second endpoint device includes a fault state and a non-fault state, where the fault state indicates that the second endpoint device is faulty and cannot work normally, and the non-fault state indicates that the second endpoint device in the extended domain can work normally. That the RCEP monitors the state of the second endpoint device in the extended domain includes receiving an error message sent by the second endpoint device, or receiving a device detection response message used to indicate whether the second endpoint device exists, and determining the state of the second endpoint device according to the error message or the device detection response message.

The RCEP may send a device detection message to a configuration space register of the second endpoint device, and acquire a device detection response message returned by the second endpoint device; if the device detection response message indicates that the second endpoint device does not exist, indicating that because of a fault the second endpoint device cannot be detected, the RCEP determines that the state of the second endpoint device is the fault state; otherwise, the RCEP determines that the state of the second endpoint device is the non-fault state; or the RCEP receives an error message from the second endpoint device, and determines a type of the error message according to the error message; if the type of the error message is an uncorrectable error type, the RCEP determines that the state of the second endpoint device is the fault state; otherwise, the RCEP determines that the state of the second endpoint device is the non-fault state.

Preferably, after receiving the error message from the second endpoint device and determining that the state of the second endpoint device is the fault state, the RCEP may further determine whether the error message is an error message sent repeatedly; if the error message is an error message sent repeatedly, indicating that the second endpoint device has already sent the error message to the primary domain to perform corresponding error handling, the RCEP discards the error message to prevent a CPU from performing unnecessary and repeated processing on the error message and to ensure system reliability; if the error message is not an error message sent repeatedly, indicating that the error message is an error message sent by the second endpoint device for the first time, the RCEP sends the error message to the CPU, so that the CPU performs error handling on the second endpoint device.

The determining whether the error message is an error message sent repeatedly includes acquiring a BDF identifier or second memory addresses that are of the second endpoint device and carried in the error message; querying a correspondence that is between the second memory addresses of the second endpoint device and the state of the second endpoint device and recorded in the device state record, and determining the state of the second endpoint device; or querying a correspondence that is between the BDF identifier of the second endpoint device and the state of the second endpoint device and recorded in the device state record, and determining the state of the second endpoint device; or determining first memory addresses of the second endpoint device according to the second memory addresses or the BDF identifier that is of the second endpoint device and in the access request, and determining the state of the second endpoint device by querying a correspondence that is between the first memory addresses of the second endpoint device and the state of the second endpoint device and recorded in the device state record; and if it is determined that the state of the second endpoint device is the fault state, determining that the error message is an error message sent repeatedly; and if it is determined that the state of the second endpoint device is the non-fault state, determining that the error message is not an error message sent repeatedly.

The first memory addresses are memory addresses, in the primary domain, of the second endpoint device, and are used to represent, in the primary domain, the second endpoint device; the second memory addresses are memory addresses, in the extended domain, of the second endpoint device, and are used to represent, in the extended domain, the second endpoint device.

202. Set a device state record according to the state of the second endpoint device, where the device state record includes a correspondence between first memory addresses of the second endpoint device and the state of the second endpoint device.

The RCEP sets the device state record according to the state of the second endpoint device, where the device state record includes the correspondence between the first memory addresses of the second endpoint device and the state of the second endpoint device, so that the RCEP may determine the state of the second endpoint device according to the first memory addresses of the second endpoint device.

The setting a device state record according to the state of the second endpoint device may include acquiring the BDF identifier or the second memory addresses that are of the second endpoint device and carried in the error message or the device detection response message.

Acquiring the first memory addresses of the second endpoint device according to the BDF identifier or the second memory addresses may be converting, by the RCEP, the second memory addresses into the first memory addresses of the second endpoint device according to a stored mapping relationship between the second memory addresses of the second endpoint device and the first memory addresses of the second endpoint device; or firstly acquiring, by the RCEP, the second memory addresses of the second endpoint device according to a stored mapping relationship between the BDF identifier of the second endpoint device and the second memory addresses of the second endpoint device, and then converting the second memory addresses into the first memory addresses of the second endpoint device according to a stored mapping relationship between the second memory addresses of the second endpoint device and the first memory addresses of the second endpoint device.

The correspondence between the first memory addresses of the second endpoint device and the state of the second endpoint device is recorded in the device state record, so that the RCEP may determine the state of the second endpoint device according to the first memory addresses of the second endpoint device.

Further, the correspondence between the second memory addresses of the second endpoint device and the state of the second endpoint device, or the correspondence between the BDF identifier of the second endpoint device and the state of the second endpoint device may be also recorded in the device state record, so that the RCEP may further determine the state of the second endpoint device according to the first memory addresses or the BDF identifier of the second endpoint device.

Because the first memory addresses of the second endpoint device includes a first memory address of configuration space access, a first memory address of MSI access, a first memory address of MMIO access, and a first memory address of DMA access, and the second memory addresses of the second endpoint device includes a second memory address of the configuration space access, a second memory address of the MSI access, a second memory address of the MMIO access, and a second memory address of the DMA access, the RCEP may acquire the first memory address of the configuration space access, the first memory address of the MSI access, the first memory address of the MMIO access, and the first memory address of the DMA access of the second endpoint device according to a stored mapping relationship between each second memory address of the second endpoint device and each first memory address of the second endpoint device; alternatively, the RCEP may acquire the second memory address of the configuration space access, the second memory address of the MSI access, the second memory address of the MMIO access, and the second memory address of the DMA of the second endpoint device according to a mapping relationship between the BDF identifier of the second endpoint device and each second memory address of the second endpoint device, and then acquire the first memory address of the configuration space access, the first memory address of the MSI access, the first memory address of the MMIO access, and the first memory address of the DMA access of the second endpoint device according to a stored mapping relationship between each second memory address of the second endpoint device and each first memory address of the second endpoint device; then, that the correspondence between the first memory addresses of the second endpoint device and the state of the second endpoint device is recorded in the device state record refers to recording a correspondence between each first memory address of the second endpoint device and the state of the second endpoint device; that the correspondence between the second memory addresses of the second endpoint device and the state of the second endpoint device is recorded in the device state record refers to recording a correspondence between each second memory address of the second endpoint device and the state of the second endpoint device.

203. Receive an access request, where the access request includes an access request from the second endpoint device to the primary domain or an access request from the primary domain to the second endpoint device.

When the first endpoint device and the primary domain perform message exchange with each other using the access request, the access request may be an access request from the second endpoint device in the extended domain and for access to the primary domain, and may also be an access request from the root complex in the primary domain or the first endpoint device in the primary domain and for access to the second endpoint device; when the access request is from the primary domain, the access request carries the first memory addresses of the second endpoint device; when the access request is from the extended domain, the access request carries the second memory addresses of the second endpoint device or the BDF identifier of the second endpoint device.

204. Query the device state record according to identifier information that is of the second endpoint device and in the access request, and determine the state of the second endpoint device.

The identifier information of the second endpoint device includes one piece of the following information or a combination thereof: the first memory addresses of the second endpoint device and the second memory addresses of the second endpoint device.

When the access request is from the primary domain, the correspondence that is between the first memory addresses of the second endpoint device and the state of the second endpoint device and recorded in the device state record is queried according to the first memory addresses that is of the second endpoint device and in the access request, and the state of the second endpoint device is determined. For example, when an MMIO access manner is used, the access request carries the first memory address of the MMIO access of the second endpoint device, and the device state record records the correspondence between each first memory address of the second endpoint device and the state of the second endpoint device. The RCEP may query the device state record using the first memory address of the MMIO access that is of the second endpoint device and in the access request, and determine the state of the second endpoint device.

When the access request is from the extended domain, the RCEP queries the device state record according to the second memory addresses or the BDF identifier that is of the second endpoint device and in the access request; if the device state record does not record the correspondence between the second memory addresses or the BDF identifier of the second endpoint device and the state of the second endpoint device, the RCEP acquires the first memory addresses of the second endpoint device according to the second memory addresses or the BDF identifier, and determines the state of the second endpoint device by querying the correspondence that is between the first memory addresses of the second endpoint device and the state of the second endpoint device and recorded in the device state record; if the device state record records the correspondence between the second memory addresses or the BDF identifier of the second endpoint device and the state of the second endpoint device, the RCEP directly queries the correspondence that is between the second memory addresses or the BDF identifier of the second endpoint device and the state of the second endpoint device and recorded in the device state record, and determines the state of the second endpoint device, which prevents converting the second memory addresses or the BDF identifier of the second endpoint device into the first memory addresses of the second endpoint device, thereby accelerating a process of determining the state of the device.

205. If the state of the second endpoint device is a fault state, discard the access request to prevent communication between the second endpoint device and the primary domain.

When it is determined that the state of the second endpoint device is the fault state, the access request is discarded to prevent the RCEP from forwarding the access request, thereby preventing the communication between the second endpoint device and the primary domain.

Further, the method may further include the following steps.

206. If the state of the second endpoint device is the fault state, send a fault isolation message to a CPU, where the fault isolation message is used to instruct the CPU in the primary domain to stop accessing the second endpoint device in the extended domain, and the fault isolation message carries the first memory addresses of the second endpoint device.

If the state of the second endpoint device is the fault state, the RCEP may send the fault isolation message to the CPU in the primary domain, so that the CPU in the primary domain stops accessing the second endpoint device in the extended domain, for example, the CPU may uninstall a driver of the faulty second endpoint device or isolate an input/output (I/O) path that is for accessing the faulty second endpoint device.

Further, if the access request is an access request that is from the primary domain and for access to the second endpoint device, the method may include the following steps.

206'. If the access request is an access request sent by the primary domain, return an analog response packet in response to the access request to the primary domain.

When the access request from the primary domain and for access to the second endpoint device is an access request of a Non-post type, a response message needs to be returned in response to the access request; otherwise, the primary domain may generate a packet return timeout error, which causes a restart of the computer system. However, when the second endpoint device is faulty, the access request may not reach the second endpoint device, or although the access request reaches the second endpoint device, the second endpoint device cannot generate a normal response message because of a fault. The RCEP may generate the analog response packet in response to the access request, and return the analog response packet to the primary domain, so as to prevent generating a packet return timeout error and causing the restart of the computer system, where the analog response packet may be an Unsupported Request (UR) packet or a Completion Abort (CA) packet.

Step 206 and step 206' are two optional steps, and are not steps required to be performed simultaneously.

In this embodiment of the present invention, the state of the second endpoint device in the extended domain is monitored, and the device state record is set according to the state of the second endpoint device, where the device state record includes the correspondence between the first memory addresses of the second endpoint device and the state of the second endpoint device; after the access request between the second endpoint device and the primary domain is received, the first memory addresses that are of the second endpoint device and in the access request are acquired, or the first memory addresses of the second endpoint device are acquired according to the BDF identifier or the second memory addresses that are of the second endpoint device and in the access request, and the correspondence that is between the first memory addresses of the second endpoint device and the state of the second endpoint device and in the device state record is queried, and the state of the second endpoint device is determined; if the state of the second endpoint device is the fault state, the access request is discarded to prevent the communication between the faulty second endpoint device and the primary domain. In addition, the fault isolation message may be further sent to the CPU to instruct the CPU to stop accessing the second endpoint device in the extended domain, thereby preventing spreading a fault to the primary domain.

Further, in this embodiment of the present invention, the device state record may record the correspondence between the BDF identifier or the second memory addresses of the second endpoint device and the state of the second endpoint device, so that the state of the second endpoint device can be determined by directly querying the device state record according to the BDF identifier, the second memory addresses or the first memory addresses that are of the second endpoint device and in the access request, which prevents converting the second memory addresses or the BDF identifier of the second endpoint device into the first memory addresses of the second endpoint device, thereby accelerating a process of determining the state of the second endpoint device.

In addition, in this embodiment of the present invention, when the state of the second endpoint device is monitored, after the error message sent by the second endpoint device is received and it is determined that the state of the second endpoint device is the fault state according to the type of the error message, it may be further determined whether the error message sent by the second endpoint device is an error message sent repeatedly; if the error message is an error message sent repeatedly, the error message is discarded to prevent the error message from reaching the primary domain, prevent spreading an error, and prevent the CPU from performing unnecessary and repeated processing on the error message, thereby ensuring system reliability.

Embodiment 3 of the Present Invention

Figure 5:
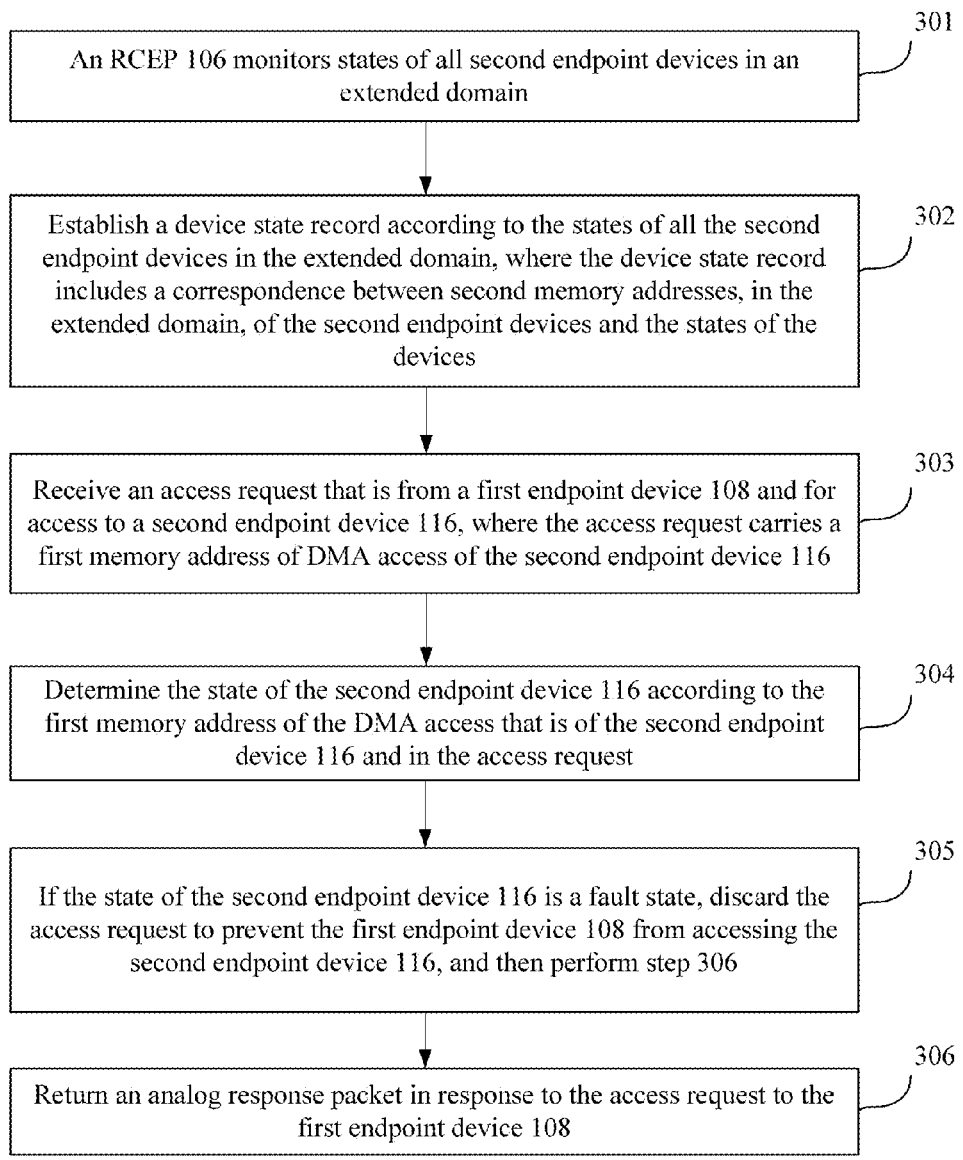
FIG. 5 is a flowchart of a fault isolation method according to Embodiment 3 of the present invention.

With reference to the computer system shown in FIG. 1, this embodiment of the present invention provides a fault isolation method shown in FIG. 5. The second endpoint device 116 in the extended domain is a faulty device, and the first endpoint device 108 in the primary domain sends an access request of a Non-post type to access the faulty second endpoint device 116 in a DMA access manner, where the access request is first routed to the RCEP 106. When the second endpoint device is faulty, the access request may have already crossed a border of the RCEP 106, that is, it may have already been forwarded by the RCEP 106, or may not have crossed the border of the RCEP 106, that is, it has not been forwarded by the RCEP 106; therefore, the method may include the following steps.

301. The RCEP 106 monitors states of all second endpoint devices in the extended domain.

The states of the devices include a fault state and a non-fault state. That the RCEP 106 monitors states of the second endpoint device 114 and the second endpoint device 116 in the extended domain includes receiving an error message sent by the second endpoint device 114 or 116, or receiving a device detection response message used to indicate whether the second endpoint device 114 or 116 exists; and determining the state of the second endpoint device 114 or 116 according to the error message or the device detection response message.

302. Set a device state record according to the states of all the second endpoint devices in the extended domain, where the device state record includes a correspondence between second memory addresses, in the extended domain, of the second endpoint devices and the states of the devices.

For example, the error message sent by the second endpoint device 116 includes a BDF identifier of the second endpoint device 116; the RCEP 106 acquires the BDF identifier of the second endpoint device 116, acquires a second memory address of configuration space access, a second memory address of MSI access, a second memory address of MMIO access, and a second memory address of DMA access of the second endpoint device 116 according to a mapping relationship between the BDF identifier of the second endpoint device 116 and each second memory address of the second endpoint device 116, acquires a first memory address of the configuration space access, a first memory address of the MSI access, a first memory address of the MMIO access, and a first memory address of the DMA access of the second endpoint device 116 according to a stored mapping relationship between each second memory address of the second endpoint device 116 and each first memory address of the second endpoint device 116, and records, in the device state record, a correspondence between each first memory address of the second endpoint device 116 and the state of the second endpoint device 116, for example, marks each first memory address of the second endpoint device 116 faulty.

Similarly, if the second endpoint device 114 is faulty, a correspondence between each first memory address of the second endpoint device 114 and the state of the second endpoint device 114 is recorded in the device state record, for example, each first memory address of the second endpoint device 114 is marked faulty.

303. Receive an access request that is from the first endpoint device 108 and for access to the second endpoint device 116, where the access request carries the first memory address of DMA access of the second endpoint device 116.

When the first endpoint device 108 performs the DMA access on the second endpoint device 116, the access request is sent to the RCEP 106 by means of address routing, and the RCEP acquires the first memory address of the DMA access that is of the second endpoint device 116 and carried in the access request.

304. Determine the state of the second endpoint device 116 according to the first memory address of the DMA access that is of the second endpoint device 116 and in the access request.

The correspondence that is between the first memory addresses of the second endpoint devices and the state of the second endpoint devices and recorded in the device state record is queried according to the first memory address of the DMA access that is of the second endpoint device 116 and in the access request, and the state of the second endpoint device 116 is determined.

When the second endpoint device 116 is faulty, if the access request has not crossed the border of the RCEP, the state of the second endpoint device recorded in the device state record is the fault state; it is determined that the state of the second endpoint device 116 is the fault state by querying a correspondence that is between the first memory address of the DMA access of the second endpoint device 116 and the state of the second endpoint device 116 and recorded in the device state record; when the second endpoint device 116 is faulty, if the access request has already crossed the border of the RCEP, the state of the second endpoint device recorded in the device state record is the non-fault state, the correspondence that is between the first memory address of the DMA access of the second endpoint device 116 and the state of the second endpoint device 116 and recorded in the device state record is queried, and it is determined that the state of the second endpoint device 116 is the non-fault state.

305. If the state of the second endpoint device 116 is a fault state, discard the access request to prevent the first endpoint device 108 from accessing the second endpoint device 116, and then perform step 306.

When the second endpoint device 116 is faulty, if the access request has not crossed the border of the RCEP 106, the RCEP determines that the state of the second endpoint device 116 to be accessed is the fault state after receiving the access request, and discards the access request to prevent the first endpoint device 108 from accessing the second endpoint device 116, thereby preventing spreading a fault to the primary domain.

306. Return an analog response packet in response to the access request to the first endpoint device 108.

Because the access request is an access request of a Non-post type, the analog response packet is generated in response to the access request, and the generated analog response packet is returned to the first endpoint device 108, which prevents the CPU in the primary domain from generating a packet return timeout error and prevents a restart of the computer system.

In this embodiment of the present invention, the RCEP 106 monitors the states of all the second endpoint devices in the extended domain, and establishes the device state record according to the states of all the second endpoint devices in the extended domain; when the first endpoint device 108 in the primary domain sends an access request to access the second endpoint device 116 in the extended domain, the RCEP 106 receives the access request, queries the device state record according to the first memory address of the DMA access in the access request, and determines the state of the second endpoint device. If the access request has not crossed the border of the RCEP 106 when the second endpoint device 116 is faulty, it is determined that the state of the second endpoint device 116 is the fault state in step 304. In this case, the RCEP 106 discards the access request to prevent the first endpoint device 108 from accessing the second endpoint device 116, thereby preventing spreading the fault to the primary domain. In addition, the RCEP may further return the analog response packet in response to the access request to the first endpoint device 108, which prevents the CPU in the primary domain from generating the packet return timeout error and prevents the restart of the computer system.

Further, if the access request has already crossed the border of the RCEP 106 when the second endpoint device 116 is faulty, it is determined that the state of the second endpoint device 116 is the non-fault state in step 304. The RCEP 106 sends the access request to the second endpoint device 116 according to a normal working process; after receiving the access request, the faulty second endpoint device 116 may be triggered by the access request to send an error message to the RCEP 106, and the faulty second endpoint device 116 may actively send an error message to the RCEP 106 to report a fault; the RCEP 106 receives the error message from the second endpoint device, and monitors the state of the second endpoint device; if a type of the error message is an uncorrectable error message type, the RCEP determines that the state of the second endpoint device is the fault state. The RCEP may further query the device state record, and determine whether the error message is an error message sent repeatedly; if the error message is an error message sent repeatedly, the RCEP discards the error message sent repeatedly, which prevents the CPU from performing unnecessary and repeated processing on the error message, thereby ensuring system reliability.

Embodiment 4 of the Present Invention

Figure 6:
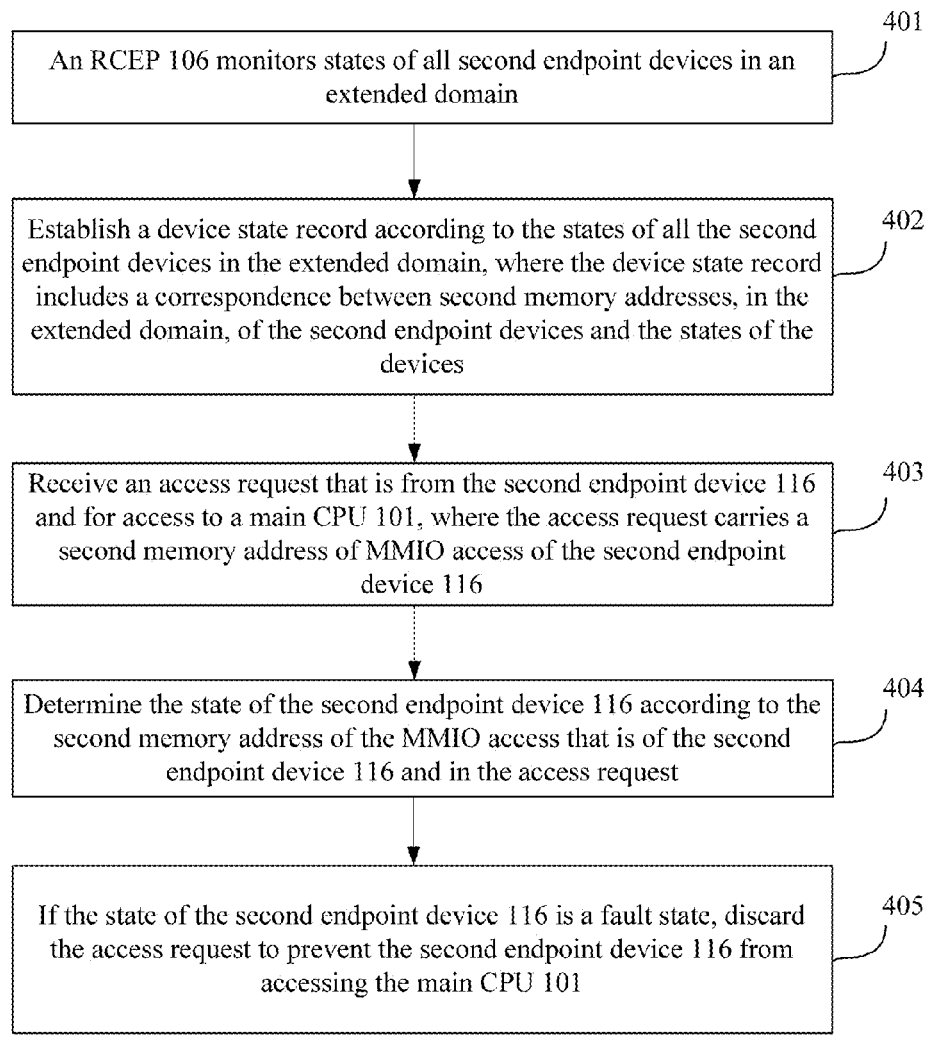
FIG. 6 is a flowchart of a fault isolation method according to Embodiment 4 of the present invention.

With reference to the computer system shown in FIG. 1, this embodiment of the present invention provides a fault isolation method shown in FIG. 6. The second endpoint device 116 in the extended domain is a faulty device, and the faulty second endpoint device 116 sends an access request of a Non-post type to access the CPU 101 in the primary domain in an MMIO access manner, where the access request is first routed to the RCEP 106. When the second endpoint device is faulty, the access request may have already crossed a border of the RCEP 106, that is, it may have already been forwarded by the RCEP 106, or may not have crossed the border of the RCEP 106, that is, it has not been forwarded by the RCEP 106; therefore, the method may include the following steps.

401. The RCEP 106 monitors states of all second endpoint devices in the extended domain.

The states of the devices include a fault state and a non-fault state. That the RCEP 106 monitors states of the second endpoint device 114 and the second endpoint device 116 in the extended domain includes receiving an error message sent by the second endpoint device 114 or 116, or receiving a device detection response message used to indicate whether the second endpoint device 114 or 116 exists; and determining the state of the second endpoint device 114 or 116 according to the error message or the device detection response message.

402. Set a device state record according to the states of all the second endpoint devices in the extended domain, where the device state record includes a correspondence between second memory addresses, in the extended domain, of the second endpoint devices and the states of the devices.

For example, the error message sent by the second endpoint device 116 includes a BDF identifier of the second endpoint device 116; the RCEP 106 acquires the BDF identifier of the second endpoint device 116, acquires a second memory address of configuration space access, a second memory address of MSI access, a second memory address of MMIO access, and a second memory address of DMA access of the second endpoint device 116 according to a mapping relationship between the BDF identifier of the second endpoint device 116 and the second memory addresses of the second endpoint device 116, acquires a first memory address of the configuration space access, a first memory address of the MSI access, a first memory address of the MMIO access, and a first memory address of the DMA access of the second endpoint device 116 according to a stored mapping relationship between the second memory addresses of the second endpoint device 116 and the first memory addresses of the second endpoint device 116, and records, in the device state record, a correspondence between each first memory address of the second endpoint device 116 and the state of the second endpoint device 116, for example, marks each first memory address of the second endpoint device 116 faulty.

Similarly, if the second endpoint device 114 is faulty, a correspondence between each first memory address of the second endpoint device 114 and the state of the second endpoint device 114, and a correspondence between a BDF identifier of the second endpoint device 114 and the state of the second endpoint device 114 are recorded in the device state record.

403. Receive an access request that is from the second endpoint device 116 and for access to the main CPU 101, where the access request carries the second memory address of MMIO access of the second endpoint device 116.

When the second endpoint device 116 performs the MMIO access on the main CPU 101, the access request is sent to the RCEP 106 by means of address routing, and the RCEP 106 acquires the second memory address of the MMIO access that is of the second endpoint device 116 and carried in the access request.

404. Determine the state of the second endpoint device 116 according to the second memory address of the MMIO access that is of the second endpoint device 116 and in the access request.

The first memory address of the MMIO access of the second endpoint device 116 is acquired according to the second memory address of the MMIO access that is of the second endpoint device 116 and in the access request and using a stored mapping relationship between each first memory address of the second endpoint device and each second memory address of the second endpoint device; a correspondence that is between the first memory addresses of the second endpoint device and the state of the second endpoint device and recorded in the device state record is queried, and the state of the second endpoint device 116 is determined.

When the second endpoint device 116 is faulty, if the access request has not crossed the border of the RCEP, it is determined that the state of the second endpoint device 116 is the fault state by querying a relationship that is between the first memory address of the DMA access of the second endpoint device 116 and the state of the second endpoint device 116 and recorded in the device state record; when the second endpoint device 116 is faulty, if the access request has already crossed the border of the RCEP, the relationship that is between the first memory address of the DMA access of the second endpoint device 116 and the state of the second endpoint device 116 and recorded in the device state record is queried, and it is determined that the state of the second endpoint device 116 is the non-fault state.

405. If the state of the second endpoint device 116 is a fault state, discard the access request to prevent the second endpoint device 116 from accessing the main CPU 101.

When the second endpoint device 116 is faulty, if the access request has not crossed the border of the RCEP 106, the RCEP 106 determines that the state of the accessed second endpoint device 116 to be accessed is the fault state after receiving the access request, and discards the access request to prevent the second endpoint device 116 from accessing the main CPU 101, thereby preventing spreading a fault to the primary domain.

In this embodiment of the present invention, the RCEP 106 monitors the states of all the second endpoint devices in the extended domain, and establishes the device state record according to the states of all the second endpoint devices in the extended domain; when the second endpoint device 116 in the extended domain sends an access request to access the main CPU 101 in the primary domain, the RCEP 106 receives the access request, acquires the first memory address of the MMIO access of the second endpoint device according to the second memory address of the MMIO access in the access request, queries the device state record, and determines the state of the second endpoint device; if the second endpoint device 116 is faulty and the access request has not crossed the border of the RCEP 106, it is determined that the state of the second endpoint device 116 is the fault state in step 404. In this case, the RCEP discards the access request to prevent the second endpoint device 116 from accessing the main CPU 101, thereby preventing spreading the fault to the primary domain.

Further, if the access request has already crossed the border of the RCEP 106 when the second endpoint device 116 is faulty, it is determined that the state of the second endpoint device 116 is the non-fault state in step 404. The RCEP 106 sends the access request to the main CPU 101 according to a normal working process; after receiving the access request, the main CPU 101 returns a response packet in response to the access request, where the returned response packet first reaches the RCEP. Because the second endpoint device has already been faulty, sending the returned response packet to the faulty second endpoint device 116 does not make any sense, and may trigger the faulty second endpoint device 116 to send an error message repeatedly. Therefore, the RCEP may discard the returned response packet.

In addition, the faulty second endpoint device 116 may actively send an error message to the RCEP to report the fault; after receiving the error message from the second endpoint device, the RCEP monitors the state of the second endpoint device; if a type of the error message is an uncorrectable error message type, it is determined that the state of the second endpoint device is the fault state, and the RCEP may further query the device state record, and determine whether the error message is an error message sent repeatedly; if the error message is an error message sent repeatedly, the RCEP discards the error message sent repeatedly to prevent spreading the fault.

Apparatuses According to Embodiments of the Present Invention

The embodiments of the present invention provide fault isolation apparatuses, which are used to prevent mutual access between a primary domain and an endpoint device in an extended domain when the endpoint device in the extended domain is faulty, thereby preventing spreading a fault to the primary domain.

Figure 7:
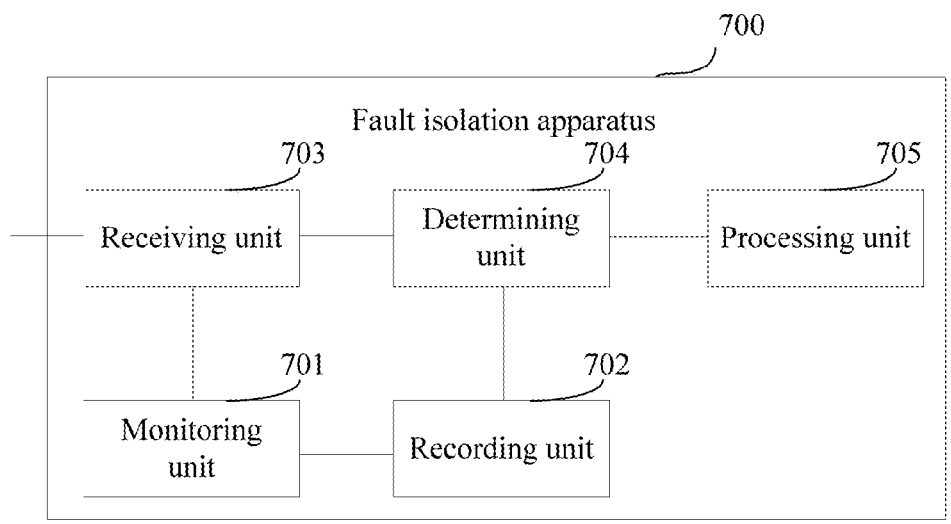
FIG. 7 is a structural diagram of a fault isolation apparatus according to an embodiment of the present invention.

FIG. 7 is a structural diagram of a fault isolation apparatus according to an embodiment of the present invention, used in a PCIe interconnected computer system, where the computer system includes a primary domain and an extended domain, the primary domain includes a root complex, a first endpoint device, and an RCEP, and the extended domain includes the RCEP and a second endpoint device. The apparatus includes a monitoring unit 701 configured to monitor a state of the second endpoint device in the extended domain; a recording unit 702 configured to set a device state record according to the state of the second endpoint device, where the device state record includes a correspondence between identifier information of the second endpoint device and the state of the second endpoint device; a receiving unit 703 configured to receive an access request, where the access request includes an access request from the second endpoint device to the primary domain or an access request from the primary domain to the second endpoint device; a determining unit 704 configured to query the device state record according to the identifier information that is of the second endpoint device and in the access request, and determine the state of the second endpoint device; and a processing unit 705 configured to, when the state of the second endpoint device is a fault state, discard the access request to prevent communication between the second endpoint device and the primary domain.

The state of the second endpoint device includes a fault state and a non-fault state; the monitoring unit 701 may receive an error message sent by the second endpoint device or receive a device detection response message used to indicate whether the second endpoint device exists, and determine the state of the second endpoint device according to the error message or the device detection response message; the recording unit 702 establishes a device state record according to the state of the second endpoint device in the monitoring unit 701, where the device state record includes the correspondence between the identifier information of the second endpoint device and the state of the second endpoint device; after the receiving unit 703 receives the access request between the second endpoint device and the primary domain, the determining unit 704 queries the device state record according to the identifier information that is of the second endpoint device and in the access request, and determines the state of the second endpoint device; the processing unit 705 is configured to, when the determining unit 704 determines that the state of the second endpoint device is the fault state, discard the access request to prevent the communication between the faulty second endpoint device and the primary domain and prevent spreading a fault to the primary domain, thereby ensuring system reliability.

Figure 8:
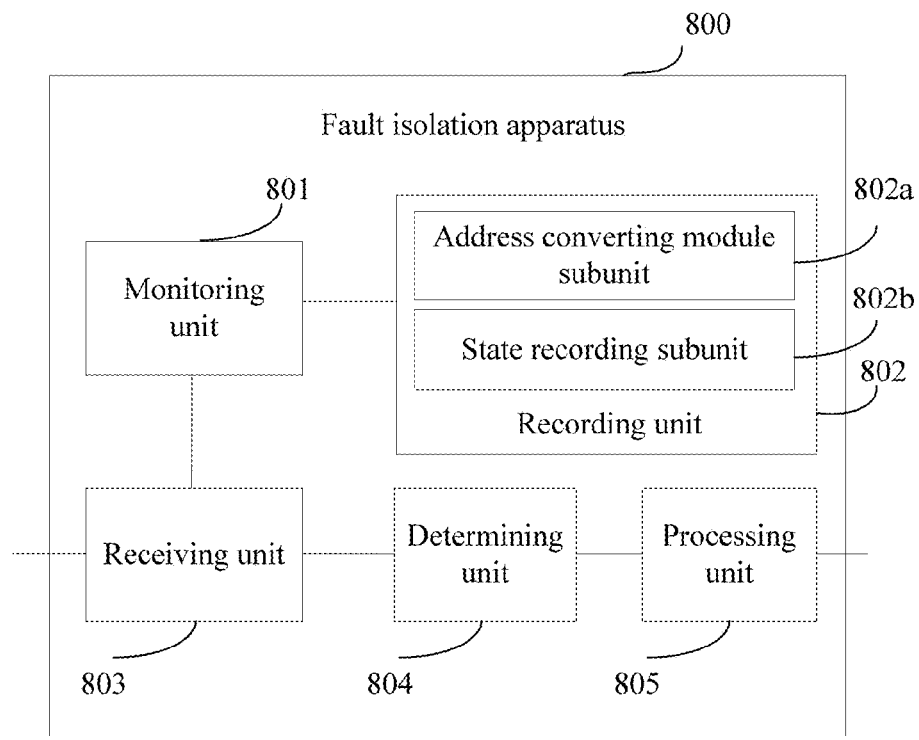
FIG. 8 is a structural diagram of a fault isolation apparatus according to an embodiment of the present invention.

FIG. 8 is a structural diagram of a fault isolation apparatus according to an embodiment of the present invention, used in a PCIe interconnected computer system, where the computer system includes a primary domain and an extended domain, the primary domain includes a root complex, a first endpoint device, and an RCEP, and the extended domain includes the RCEP and a second endpoint device; and the second endpoint device performs communication interaction with the root complex or the first endpoint device in the primary domain using the RCEP. The apparatus may include a monitoring unit 801, a recording unit 802, a receiving unit 803, a determining unit 804, and a processing unit 805, and the fault isolation apparatus may be the RCEP.

The monitoring unit 801 is configured to monitor a state of the second endpoint device in the extended domain, where the state of the second endpoint device includes a fault state and a non-fault state, where the fault state indicates that the second endpoint device is faulty and cannot work normally, and the non-fault state indicates that the second endpoint device in the extended domain can work normally. That the monitoring unit 801 monitors the state of the second endpoint device in the extended domain includes receiving an error message sent by the second endpoint device, or receiving a device detection response message used to indicate whether the second endpoint device exists, and determining the state of the second endpoint device according to the error message or the device detection response message. The monitoring unit 801 may send a device detection message to a configuration space register of the second endpoint device, and acquire a device detection response message returned by the second endpoint device; if the device detection response message indicates that the second endpoint device does not exist, indicating that because of a fault the second endpoint device cannot be detected, it is determined that the state of the second endpoint device is the fault state; otherwise, it is determined that the state of the second endpoint device is the non-fault state; or, the monitoring unit 801 receives an error message from the second endpoint device, and determines a type of the error message according to the error message; if the type of the error message is an uncorrectable error message type, it is determined that the state of the second endpoint device is the fault state; otherwise, it is determined that the state of the second endpoint device is the non-fault state.

The recording unit 802 is configured to set a device state record according to the state of the second endpoint device, where the device state record includes a correspondence between first memory addresses of the second endpoint device and the state of the second endpoint device, where the first memory addresses are memory addresses, in the primary domain, of the second endpoint device, and are used to represent, in the primary domain, the second endpoint device.

The recording unit 802 includes an address converting module subunit 802a and a state recording subunit 802b, where the address converting module subunit 802a is configured to acquire a BDF identifier or second memory addresses that are of the second endpoint device and carried in the error message or the device detection response message, acquire the first memory addresses of the second endpoint device according to the BDF identifier or the second memory addresses; the address converting module subunit 802a stores a mapping relationship between the second memory addresses of the second endpoint device and the first memory addresses of the second endpoint device and a mapping relationship between the BDF identifier of the second endpoint device and the second memory addresses of the second endpoint device, and converts the second memory addresses into the first memory addresses of the second endpoint device according to the stored mapping relationship between the second memory addresses of the second endpoint device and the first memory addresses of the second endpoint device, or acquires the second memory addresses of the second endpoint device according to the stored mapping relationship between the BDF identifier of the second endpoint device and the second memory addresses of the second endpoint device, and converts the second memory addresses into the first memory addresses of the second endpoint device according to the stored mapping relationship between the second memory addresses of the second endpoint device and the first memory addresses of the second endpoint device; the state recording subunit 802b is configured to record, in the device state record, a correspondence between the first memory addresses of the second endpoint device and the state of the second endpoint device, so that the RCEP may determine the state of the second endpoint device according to the first memory addresses of the second endpoint device, where the second memory addresses of the second endpoint device are memory addresses, in the extended domain, of the second endpoint device, and are used to represent, in the extended domain, the second endpoint device.

Further, the state recording subunit 802b may be configured to record, in the device state record, the correspondence between the first memory addresses of the second endpoint device and the state of the second endpoint device, or the correspondence between the BDF identifier of the second endpoint device and the state of the second endpoint device, so that the determining unit 803 may further determine the state of the second endpoint device according to the first memory addresses or the BDF identifier of the second endpoint device.

Because the first memory addresses of the second endpoint device includes a first memory address of configuration space access, a first memory address of MSI access, a first memory address of MMIO access, and a first memory address of DMA access, and the second memory addresses of the second endpoint device includes a second memory address of the configuration space access, a second memory address of the MSI access, a second memory address of the MMIO access, and a second memory address of the DMA access, the address converting module subunit 802a is configured to store a mapping relationship between each second memory address of the second endpoint device and each first memory address of the second endpoint device and a mapping relationship between the BDF identifier of the second endpoint device and each second memory address of the second endpoint device; and acquire the first memory address of the configuration space access, the first memory address of the MSI access, the first memory address of the MMIO access, and the first memory address of the DMA access of the second endpoint device according to the stored mapping relationship between each second memory address of the second endpoint device and each first memory address of the second endpoint device, or first acquire the second memory address of the configuration space access, the second memory address of the MSI access, the second memory address of the MMIO access, and the second memory address of the DMA access of the second endpoint device according to the mapping relationship between the BDF identifier of the second endpoint device and each second memory address of the second endpoint device, and then acquire the first memory address of the configuration space access, the first memory address of the MSI access, the first memory address of the MMIO access, and the first memory address of the DMA access of the second endpoint device according to the stored mapping relationship between each second memory address of the second endpoint device and each first memory address of the second endpoint device; the recording subunit 802b is configured to record a correspondence between each first memory address of the second endpoint device and the state of the second endpoint device, or is further configured to record a correspondence between each second memory address of the second endpoint device and the state of the second endpoint device, or is further configured to record the correspondence between the BDF identifier of the second endpoint device and the state of the second endpoint device.

The receiving unit 803 is configured to receive an access request, where the access request includes an access request from the second endpoint device to the primary domain or an access request from the primary domain to the second endpoint device; when the access request is from the primary domain, the access request carries the first memory addresses of the second endpoint device; when the access request is from the extended domain, the access request carries the second memory addresses of the second endpoint device or the BDF identifier of the second endpoint device.

The determining unit 804 is configured to query the device state record according to identifier information that is of the second endpoint device and in the access request, and determine the state of the second endpoint device, where the identifier information of the second endpoint device includes one piece of the following information or a combination thereof the first memory addresses of the second endpoint device, the second memory addresses of the second endpoint device, and the BDF identifier of the second endpoint device. When the access request is from the primary domain, the determining unit 804 queries, according to the first memory addresses that are of the second endpoint device and in the access request, the correspondence that is between the first memory addresses of the second endpoint device and the state of the second endpoint device and recorded in the device state record, and determines the state of the second endpoint device. For example, when an MMIO access manner is used, the access request carries the first memory address of the MMIO access of the second endpoint device, and the device state record records the correspondence between each first memory address of the second endpoint device and the state of the second endpoint device. The determining unit 804 may query the device state record using the first memory address of the MMIO access that is of the second endpoint device and in the access request, and determine the state of the second endpoint device. When the access request is from the extended domain, the determining unit 804 queries the device state record according to the second memory addresses or the BDF identifier that is of the second endpoint device and in the access request; if the device state record does not record the correspondence between the second memory addresses or the BDF identifier of the second endpoint device and the state of the second endpoint device, the determining unit 804 acquires the first memory addresses of the second endpoint device according to the second memory addresses or the BDF identifier, and determines the state of the second endpoint device by querying the correspondence that is between the first memory addresses of the second endpoint device and the state of the second endpoint device and recorded in the device state record; if the device state record records the correspondence between the second memory addresses or the BDF identifier of the second endpoint device and the state of the second endpoint device, the determining unit 804 determines the state of the second endpoint device by directly querying the correspondence that is between the second memory addresses or the BDF identifier of the second endpoint device and the state of the second endpoint device and recorded in the device state record, which prevents converting the second memory addresses or the BDF identifier of the second endpoint device into the first memory addresses of the second endpoint device, thereby accelerating a process of determining the state of the device.

The processing unit 805 is configured to, when the determining unit 804 determines that the state of the second endpoint device is the fault state, discard the access request to prevent communication between the second endpoint device and the primary domain.

The processing unit 805 is further configured to, when the determining unit 804 determines that the state of the second endpoint device is the fault state, send a fault isolation message to a CPU, so that the CPU in the primary domain stops accessing the second endpoint device in the extended domain, for example, the CPU may uninstall a driver of the faulty second endpoint device or isolate an I/O path that is for accessing the faulty second endpoint device, where the fault isolation message carries the first memory addresses of the second endpoint device.

The processing unit 805 is further configured to, when the access request is an access request sent by the primary domain, return an analog response packet in response to the access request to the primary domain. When the access request from the primary domain and for access to the second endpoint device is a Non-post type access request, a response message needs to be returned in response to the access request; otherwise, the primary domain may generate a packet return timeout error, which causes a restart of the computer system. However, when the second endpoint device is faulty, the access request may not reach the second endpoint device, or although the access request reaches the second endpoint device, the second endpoint device cannot generate a normal response message because of a fault. The processing unit 805 may generate the analog response packet in response to the access request, and return the analog response packet to the primary domain, so as to prevent generating a packet return timeout error and causing the restart of the computer system, where the analog response packet may be an UR packet or a CA packet.

Preferably, after determining that the state of the second endpoint device is the fault state according to the received error message, the monitoring unit 801 is further configured to determine whether the error message is an error message sent repeatedly; if the error message is an error message sent repeatedly, indicating that the second endpoint device has already sent the error message to the primary domain to perform corresponding error handling, discard the error message to prevent the CPU from performing unnecessary and repeated processing on the error message and to ensure system reliability; and if the error message is not an error message sent repeatedly, indicating that the error message is an error message sent by the second endpoint device for the first time, the RCEP sends the error message to the CPU, so that the CPU performs error handling on the second endpoint device. The determining whether the error message is an error message sent repeatedly includes acquiring the BDF identifier or the second memory addresses that are of the second endpoint device and carried in the error message; querying a correspondence that is between the second memory addresses of the second endpoint and the state of the second endpoint device and recorded in the device state record, and determining the state of the second endpoint device; or querying the correspondence that is between the BDF identifier of the second endpoint device and the state of the second endpoint device and recorded in the device state record, and determining the state of the second endpoint device; or determining the first memory addresses of the second endpoint device according to the second memory addresses or the BDF identifier that is of the second endpoint device and in the access request, and determining the state of the second endpoint device by querying the correspondence that is between the first memory addresses of the second endpoint device and the state of the second endpoint device and recorded in the device state record; if it is determined that the state of the second endpoint device is the fault state, determining that the error message is an error message sent repeatedly, and if it is determined that the state of the second endpoint device is the non-fault state, determining that the error message is not an error message sent repeatedly.

In this embodiment of the present invention, the monitoring unit 801 monitors the state of the second endpoint device in the extended domain; the recording unit 802 establishes the device state record according to the state that is of the second endpoint device and determined by the monitoring unit 801, where the device state record includes the correspondence between the first memory addresses of the second endpoint device and the state of the second endpoint device; after the receiving unit 803 receives the access request between the second endpoint device and the primary domain, the determining unit 804 acquires the first memory addresses that are of the second endpoint device and in the access request, or acquires the first memory addresses of the second endpoint device according to the BDF identifier or the second memory addresses that are of the second endpoint device and in the access request, queries the correspondence that is between the first memory addresses of the second endpoint device and the state of the second endpoint device and recorded in the device state record, and determines the state of the second endpoint device; if the determining unit 804 determines that the state of the second endpoint device is the fault state, the processing unit 805 discards the access request to prevent the communication between the faulty second endpoint device and the primary domain. In addition, the processing unit 805 may further send the fault isolation message to the CPU to instruct the CPU to stop accessing the second endpoint device in the extended domain, thereby preventing spreading a fault to the primary domain.

Further, in this embodiment of the present invention, the recording unit 802 may record, in the device state record, the correspondence between the BDF identifier or the second memory addresses of the second endpoint device and the state of the second endpoint device, so that the determining unit 804 can determine the state of the second endpoint device by directly querying the device state record according to the BDF identifier, the second memory addresses or the first memory addresses that are of the second endpoint device and in the access request, which prevents converting the second memory addresses or the BDF identifier of the second endpoint device into the first memory addresses of the second endpoint device, thereby accelerating a process of determining the state of the second endpoint device.

In addition, in this embodiment of the present invention, when monitoring unit 801 monitors the state of the second endpoint device, after receiving the error message sent by the second endpoint device and determining that the state of the second endpoint device is the fault state according to the type of the error message, the monitoring unit 801 may further determine whether the error message sent by the second endpoint device is an error message sent repeatedly; if the error message is an error message sent repeatedly, the error message is discarded to prevent the error message from reaching the primary domain and prevent the CPU from performing unnecessary and repeated processing on the error message, thereby ensuring system reliability.

Figure 9:
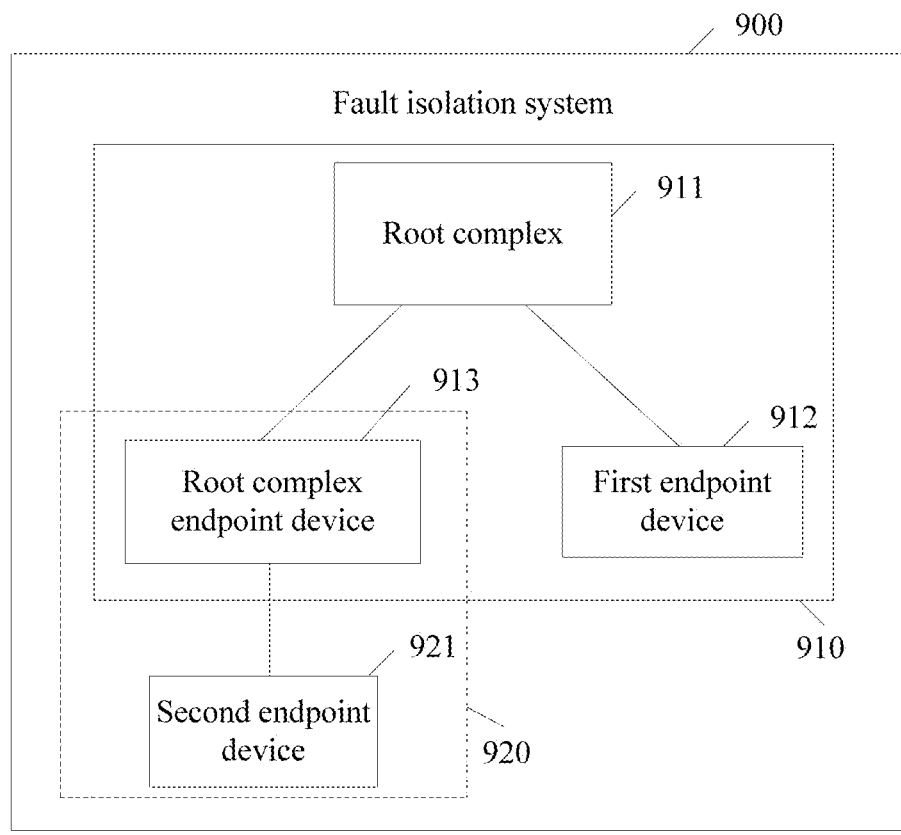
FIG. 9 is a structural diagram of a fault isolation system according to an embodiment of the present invention.

FIG. 9 is a fault isolation system 900 according to an embodiment of the present invention, where the system 900 includes a PCIe primary domain 910 and a PCIe extended domain 920, where the primary domain includes a root complex 911, a first endpoint device 912, and a root complex endpoint device 913, and the extended domain 920 includes the root complex endpoint device 913 and a second endpoint device 921. The root complex endpoint device 913 is configured to monitor a state of the second endpoint device 921 in the extended domain; set a device state record according to the state of the second endpoint device 921, where the device state record includes a correspondence between identifier information of the second endpoint device 921 and the state of the second endpoint device 921; receive an access request, where the access request includes an access request from the second endpoint device 921 to the primary domain 910 or an access request from the primary domain 910 to the second endpoint device 921; query the device state record according to the identifier information that is of the second endpoint device 921 and in the access request, and determine the state of the second endpoint device 921; and if the state of the second endpoint device 921 is a fault state, discard the access request to prevent communication between the second endpoint device 921 and the primary domain 910.

In this embodiment of the present invention, the state of the second endpoint device in the extended domain is monitored, and the device state record is established according to the state of the second endpoint device; after the access request between the second endpoint device and the primary domain is received, the device state record is queried according to the identifier information that is of the second endpoint device and in the access request, and the state of the second endpoint device is determined; if the state of the second endpoint device is the fault state, the access request is discarded to prevent the communication between the faulty second endpoint device and the primary domain and prevent spreading a fault to the primary domain, thereby ensuring system reliability.

Figure 10:
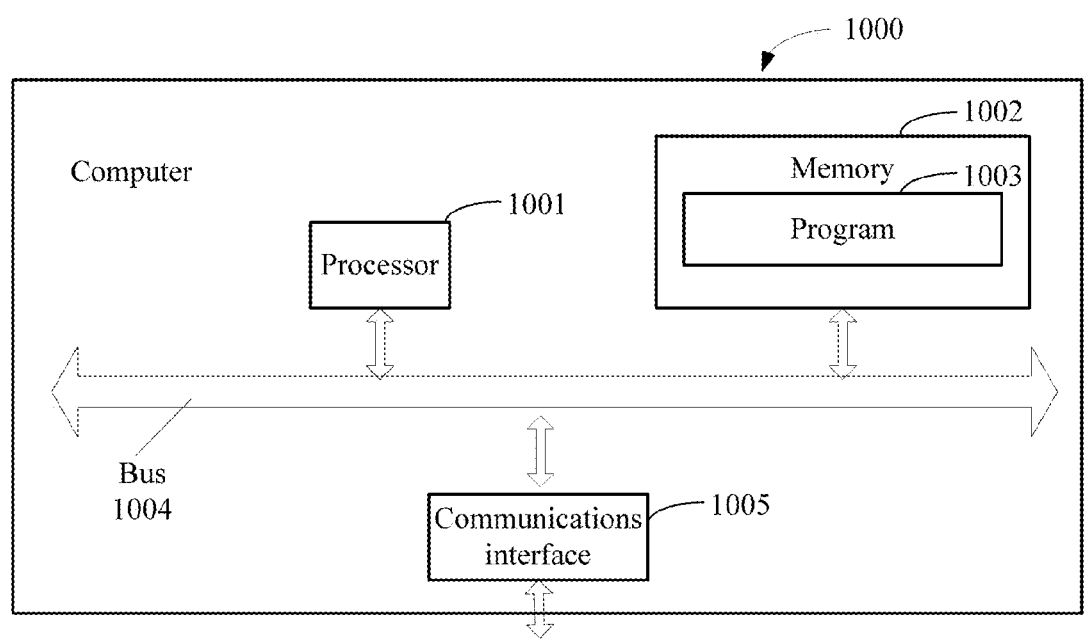
FIG. 10 is a structural diagram of a fault isolation apparatus according to an embodiment of the present invention.

FIG. 10 is a schematic structural diagram of a fault isolation apparatus according to an embodiment of the present invention. The fault isolation apparatus according to this embodiment of the present invention is used in a PCIe interconnected computer system, where the computer system includes a primary domain and an extended domain, the primary domain includes a root complex, a first endpoint device, and a root complex endpoint device, and the extended domain includes the root complex endpoint device and a second endpoint device.

The fault isolation apparatus may include a processor 1001, a memory 1002, a system bus 1004, and a communications interface 1005, where the processor 1001, the memory 1002, and the communications interface 1005 are connected by and implement mutual communication using the system bus 1004.

The processor 1001 may be a single-core or multi-core central processing unit, or be an application-specific integrated circuit, or be configured as one or more integrated circuits that implement this embodiment of the present invention.

The memory 1002 may be a high-speed random access memory (RAM) or a non-volatile memory, for example, at least one magnetic disk memory.

The memory 1002 is used for a computer-executable instruction 1003. The computer-executable instruction 1003 may include program code.

When the fault isolation apparatus is running, the processor 1001 runs the computer-executable instruction 1003, and may perform the following method: monitoring a state of the second endpoint device in the extended domain; setting a device state record according to the state of the second endpoint device, where the device state record includes a correspondence between identifier information of the second endpoint device and the state of the second endpoint device; receiving an access request, where the access request includes an access request from the second endpoint device to the primary domain or an access request from the primary domain to the second endpoint device; querying the device state record according to the identifier information that is of the second endpoint device and in the access request, and determining the state of the second endpoint device; and if the state of the second endpoint device is a fault state, discarding the access request to prevent communication between the second endpoint device and the primary domain.

The method may further include monitoring the state of the second endpoint device in the extended domain; setting a device state record according to the state of the second endpoint device, where the device state record includes a correspondence between first memory addresses of the second endpoint device and the state of the second endpoint device; receiving an access request, where the access request includes an access request from the second endpoint device to the primary domain or an access request from the primary domain to the second endpoint device; querying the device state record according to the identifier information that is of the second endpoint device and in the access request, and determining the state of the second endpoint device; and if the state of the second endpoint device is the fault state, discarding the access request to prevent the communication between the second endpoint device and the primary domain; if the state of the second endpoint device is the fault state, sending a fault isolation message to a CPU, where the fault isolation message is used to instruct the CPU in the primary domain to stop accessing the second endpoint device in the extended domain, and the fault isolation message carries the first memory addresses of the second endpoint device; or if the access request is an access request sent by the primary domain, returning an analog response packet in response to the access request to the primary domain.

A person of ordinary skill in the art should understand that each aspect of the present invention or a possible implementation manner of each aspect may be implemented as a system, a method or a computer program product. Therefore, each aspect of the present invention or the possible implementation manner of each aspect may use a form of a complete hardware embodiment, a complete software embodiment (including firmware, resident software, and the like) or an embodiment combining software and hardware, which is uniformly referred to as "circuit", "module" or "system". In addition, each aspect of the present invention or the possible implementation manner of each aspect may use a form of a computer program product, where the computer program product refers to computer readable program code stored in a computer readable medium.

The computer readable medium may be a computer readable signal medium or a computer readable storage medium. The computer readable storage medium includes but is not limited to an electronic, a magnetic, an optical, an electromagnetic, an infrared or a semiconductor system, device or apparatus or any proper combination thereof, such as a RAM, a read-only memory (ROM), an erasable programmable read-only memory ((EPROM) or flash memory), an optical fiber, or a portable compact-disc read-only memory (CD-ROM).

A processor in a computer reads computer readable program code stored in a computer readable medium, so that the processor can execute a function and an action specified in each step or a combination of steps in a flowchart, and an apparatus is generated to implement a function and an action specified in each block or a combination of blocks in a block diagram.

Computer readable program code may be completely executed on a computer of a user, partially executed on the computer of the user, used as a separate software package, partly executed on the computer of the user and partly executed on a remote computer, or completely executed on the remote computer or a server. It should also be noted that in some alternative implementation schemes, functions denoted in each step of flowcharts or in each block of block diagrams may not occur in a sequence shown in the diagrams. For example, depending on an involved function, two steps or two blocks successively marked may be approximately performed concurrently, or these blocks sometimes may be performed in a reverse order.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A fault isolation method, used in a Peripheral Component Interconnect Express (PCIe) interconnected computer system, wherein the computer system comprises:
   a root complex;
   at least one first endpoint device;
   a root complex endpoint device; and
   at least one second endpoint device, wherein the root complex, the at least one first endpoint device, and the root complex endpoint device are set in a primary domain, and wherein the root complex endpoint device and the at least one second endpoint device are set in an extended domain, the method comprising:
      monitoring a state of the second endpoint device in the extended domain;
      setting a device state record according to the state of the second endpoint device, wherein the device state record comprises a correspondence between identifier information of the second endpoint device and the state of the second endpoint device;

receiving an access request between the primary domain and the extended domain, wherein the access request comprises an access request from the second endpoint device of the extended domain to the primary domain or an access request from the primary domain to the second endpoint device of the extended domain;

querying the device state record according to the identifier information that is of the second endpoint device and in the access request;

determining the state of the second endpoint device; and discarding the access request to prevent communication between the second endpoint device of the extended domain and the primary domain when the state of the second endpoint device is a fault state.

2. The method according to claim 1 further comprising:

configuring first memory addresses and second memory addresses for each second endpoint device, wherein the first memory addresses are used to represent the second endpoint device in the primary domain, wherein the second memory addresses are used to represent the second endpoint device in the extended domain;

configuring a bus/device/function (BDF) identifier for each second endpoint device;

storing a mapping relationship between the BDF identifier of the second endpoint device and the second memory address of the second endpoint device; and storing a mapping relationship between the first memory addresses of the second endpoint device and the second memory addresses of the second endpoint device.

3. The method according to claim 2, wherein monitoring the state of the second endpoint device in the extended domain, and setting the device state record according to the state of the second endpoint device comprises:

receiving an error message or a device detection response message used to indicate whether the second endpoint device exists sent by the second endpoint device;

determining the state of the second endpoint device according to the error message or the device detection response message;

acquiring the BDF identifier of the second endpoint device carried in the error message or the device detection response message; and recording, in the device state record, a correspondence between the BDF identifier of the second endpoint device and the state of the second endpoint device.

4. The method according to claim 3 further comprising:

converting the BDF identifier of the second endpoint device into the second memory addresses of the second endpoint device according to the mapping relationship between the BDF identifier of the second endpoint device and the second memory address of the second endpoint device;

converting the second memory addresses of the second endpoint device into the first memory addresses of the second endpoint device according to the mapping relationship between the first memory addresses of the second endpoint device and the second memory addresses of the second endpoint device; and recording, in the device state record, a correspondence between the first memory addresses of the second endpoint device and the state of the second endpoint device.

5. The method according to claim 4 further comprising recording, in the device state record, a correspondence between the second memory addresses of the second endpoint device and the state of the second endpoint device.

6. The method according to claim 4, wherein the first memory addresses of the second endpoint device comprise:

a first memory address of configuration space access;

a first memory address of message signaled interrupts access;

a first memory address of memory mapped input/output access; and a first memory address of DMA access, and wherein recording, in the device state record, the correspondence between the first memory addresses of the second endpoint device and the state of the second endpoint device comprises recording, in the device state record, a correspondence between each first memory address of the second endpoint device and the state of the second endpoint device.

7. The method according to claim 6, wherein the second memory addresses of the second endpoint device comprise:

a second memory address of the configuration space access;

a second memory address of the message signaled interrupts access;

a second memory address of the memory mapped input/output access; and a second memory address of the DMA access, wherein the mapping relationship between the second memory addresses of the second endpoint device and the first memory addresses of the second endpoint device comprises a mapping relationship between each second memory address of the second endpoint device and each first memory address of the second endpoint device.

8. The method according to claim 4 further comprising returning an analog response packet in response to the access request to the primary domain when the access request is an access request from the primary domain to the second endpoint device.

9. The method according to claim 3 further comprising sending a fault isolation message to a CPU in the primary domain, wherein the fault isolation message is used to instruct the CPU in the primary domain to stop accessing the second endpoint device in the extended domain, and wherein the fault isolation message carries the first memory addresses of the second endpoint device.

10. The method according to claim 3, wherein, after receiving the error message sent by the second endpoint device, the method further comprises:

determining whether the error message is an error message sent repeatedly; and discarding the error message when the error message is an error message sent repeatedly.

11. A fault isolation system, wherein the system is a Peripheral Component Interconnect Express (PCIe) interconnected computer system comprising:

a root complex;

at least one first endpoint device;

a root complex endpoint device; and at least one second endpoint device, wherein the root complex, the at least one first endpoint device, and the root complex endpoint device are set in a primary domain, and wherein the root complex endpoint device and the at least one second endpoint device are set in an extended domain, and wherein the root complex endpoint device is configured to:

monitor a state of the second endpoint device in the extended domain;

set a device state record according to the state of the second endpoint device, wherein the device state record comprises a correspondence between identifier information of the second endpoint device and the state of the second endpoint device;

receive an access request sent by the second endpoint device or an access request from the primary domain to the second endpoint device;

query the device state record according to the identifier information that is of the second endpoint device and in the access request;

determine the state of the second endpoint device; and discard the access request to prevent communication between the second endpoint device and the primary domain when the state of the second endpoint device is a fault state.

12. The system according to claim 11, wherein the root complex endpoint device is configured to:

configure first memory addresses and second memory addresses for each second endpoint device, wherein the first memory addresses are used to represent the second endpoint device in the primary domain, wherein the second memory addresses are used to represent the second endpoint device in the extended domain;

configure a bus/device/function (BDF) identifier for each second endpoint device;

store a mapping relationship between the BDF identifier of the second endpoint device and the second memory address of the second endpoint device; and store a mapping relationship between the first memory addresses of the second endpoint device and the second memory addresses of the second endpoint device.

13. The system according to claim 12, wherein the root complex endpoint device is configured to:

receive an error message or a device detection response message used to indicate whether the second endpoint device exists sent by the second endpoint device;

determine the state of the second endpoint device according to the error message or the device detection response message;

acquire the BDF identifier carried in the error message or the device detection response message; and record a correspondence between the BDF identifier of the second endpoint device and the state of the second endpoint device in the device state record.

14. The system according to claim 13, wherein the root complex endpoint device is configured to:

convert the BDF identifier into the second memory addresses of the second endpoint device according to the mapping relationship between the BDF identifier of the second endpoint device and the second memory address of the second endpoint device;

convert the second memory addresses of the second endpoint device into the first memory addresses of the second endpoint device according to the mapping relationship between the first memory addresses of the second endpoint device and the second memory addresses of the second endpoint device; and record a correspondence between the first memory addresses of the second endpoint device and the state of the second endpoint device in the device state record.

15. The system according to claim 14, wherein the root complex endpoint device is configured to record a correspondence between the second memory addresses of the second endpoint device and the state of the second endpoint device in the device state record.

16. The system according to claim 13, wherein the root complex endpoint device is configured to send a fault isolation message to a CPU in the primary domain, wherein the fault isolation message is used to instruct the CPU in the primary domain to stop accessing the second endpoint device in the extended domain, and the fault isolation message carries the first memory addresses of the second endpoint device.

17. The system according to claim 13, wherein the root complex endpoint device is configured to return an analog response packet in response to the access request to the primary domain when the access request is an access request from the primary domain to the second endpoint device.

18. The system according to claim 13, wherein the root complex endpoint device is configured to:

determine whether the error message is an error message sent repeatedly; and discarding the error message when the error message is an error message sent repeatedly.

19. A fault isolation apparatus, used in a Peripheral Component Interconnect Express (PCIe) interconnected computer system, wherein the computer system comprises:

a root complex;

at least one first endpoint device;

a root complex endpoint device; and at least one second endpoint device, wherein the root complex, the at least one first endpoint device, and the root complex endpoint device are set in a primary domain, and wherein the root complex endpoint device and the at least one second endpoint device are set in an extended domain, wherein the apparatus comprises:

a processor;

a memory;

a bus; and a communications interface, wherein the memory is configured to store a computer-executable instruction, wherein the processor and the memory are connected using the bus, wherein, when the fault isolation apparatus is run, the processor executes the computer-executable instruction stored in the memory, so that the fault isolation apparatus performs a fault isolation method, used in the PCIe interconnected computer system, the method comprising:

monitoring a state of the second endpoint device in the extended domain;

setting a device state record according to the state of the second endpoint device, wherein the device state record comprises a correspondence between identifier information of the second endpoint device and the state of the second endpoint device;

receiving an access request between the primary domain and the extended domain, wherein the access request comprises an access request from the second endpoint device of the extended domain to the primary domain or an access request from the primary domain to the second endpoint device of the extended domain;

querying the device state record according to the identifier information that is of the second endpoint device and in the access request;

determining the state of the second endpoint device; and discarding the access request to prevent communication between the second endpoint device of the extended domain and the primary domain when the state of the second endpoint device is a fault state.

* * * * *